(12) United States Patent
Hirzel

(10) Patent No.: US 7,034,427 B2
(45) Date of Patent: Apr. 25, 2006

(54) SELECTIVE ALIGNMENT OF STATORS IN AXIAL AIRGAP ELECTRIC DEVICES COMPRISING LOW-LOSS MATERIALS

(75) Inventor: Andrew D. Hirzel, Kalamazoo, MI (US)

(73) Assignee: Light Engineering, Inc., Indianapolis, IN (US)

( * ) Notice: Subject to any disclaimer, the term of this patent is extended or adjusted under 35 U.S.C. 154(b) by 0 days.

(21) Appl. No.: 10/919,014

(22) Filed: Aug. 16, 2004

(65) Prior Publication Data

US 2005/0040728 A1    Feb. 24, 2005

Related U.S. Application Data

(60) Provisional application No. 60/496,368, filed on Aug. 18, 2003.

(51) Int. Cl.
*H02K 16/04* (2006.01)
*H02K 19/26* (2006.01)

(52) U.S. Cl. ............... 310/191; 310/156.35; 310/254

(58) Field of Classification Search ............... 310/254, 310/266, 42, 261, 156, 191
See application file for complete search history.

(56) References Cited

U.S. PATENT DOCUMENTS

| | | | |
|---|---|---|---|
| 2,824,275 A | | 2/1958 | Kober .................. 322/27 |
| 2,892,144 A | | 6/1959 | Kober .................. 322/49 |
| 3,233,133 A | * | 2/1966 | Kober .................. 310/191 |
| 4,142,571 A | | 3/1979 | Narasimhan .................. 164/88 |
| 4,151,435 A | * | 4/1979 | Jandeska et al. ........ 310/154.07 |
| 4,187,441 A | * | 2/1980 | Oney .................. 310/112 |
| 4,265,682 A | * | 5/1981 | Tsuya et al. ................ 148/112 |
| 4,363,988 A | * | 12/1982 | Kliman .................. 310/268 |
| 4,371,801 A | * | 2/1983 | Richter .................. 310/156.36 |
| 4,520,300 A | * | 5/1985 | Fradella .................. 318/603 |

(Continued)

FOREIGN PATENT DOCUMENTS

GB    2266197    * 10/1993

(Continued)

OTHER PUBLICATIONS

Hughes, A. "Electric Motors & Drives" 1990, pp. 58-59.*

(Continued)

*Primary Examiner*—Burton Mullins
(74) *Attorney, Agent, or Firm*—Ernest D. Buff & Associates, LLC; Ernest D. Buff; Gordon E. Fish

(57) ABSTRACT

An axial gap dynamoelectric machine comprises first and second stators disposed coaxially with an intermediate rotor. The stators are selectively aligned with an axial offset between the positions of their respective teeth and slots. The stators comprise toroidal cores having laminated layers composed of a material selected from the group consisting of amorphous and nanocrystalline metals and optimized Fe-based alloy. Optionally, the machine further comprises misalignment means for adjusting the offset of the stators. Adaptive adjustment permits the machine to be operated to in a mode that reduces the back EMF of the motor, allowing constant voltage to be maintained as speed is increased. Reducing back EMF also allows a wider range of operating speed, especially in combination with use of high pole counts. Alternatively, the machine can be operated, e.g. at lower speed, in a constant torque mode. The machine may exploit the high pole count achievable by use of improved soft magnetic materials. Also provided are techniques for reducing torque ripple during operation, and also for using the stator offset in combination with a dual full wave bridge rectifier arrangement.

16 Claims, 19 Drawing Sheets

U.S. PATENT DOCUMENTS

| | | | |
|---|---|---|---|
| 4,578,610 A * | 3/1986 | Kliman et al. | 310/156.35 |
| RE32,925 E | 5/1989 | Chen et al. | 148/403 |
| 403,017 A | 5/1989 | Wheeler | |
| 4,865,657 A * | 9/1989 | Das et al. | 148/113 |
| 4,881,989 A * | 11/1989 | Yoshizawa et al. | 148/302 |
| 5,179,306 A * | 1/1993 | Nasar | 310/14 |
| 5,216,339 A * | 6/1993 | Skybyk | 318/254 |
| 5,334,899 A * | 8/1994 | Skybyk | 310/268 |
| 5,627,419 A | 5/1997 | Miller | 310/74 |
| 5,907,210 A * | 5/1999 | Chaix | 310/268 |
| 5,925,965 A * | 7/1999 | Li et al. | 310/268 |
| 5,935,347 A * | 8/1999 | Suzuki et al. | 148/121 |
| 6,037,696 A * | 3/2000 | Sromin et al. | 310/268 |
| 6,049,149 A * | 4/2000 | Lin et al. | 310/68 R |
| 6,194,802 B1 | 2/2001 | Rao | 310/91 |
| 6,534,938 B1 * | 3/2003 | Wu et al. | 318/254 |
| 6,555,941 B1 * | 4/2003 | Zepp et al. | 310/191 |
| 6,827,557 B1 * | 12/2004 | Kim | 417/35 |
| 2004/0070307 A1 * | 4/2004 | Haugan et al. | 310/268 |

FOREIGN PATENT DOCUMENTS

| | | | |
|---|---|---|---|
| JP | 07-336967 | * | 12/1995 |
| WO | 9919962 A1 | * | 4/1999 |
| WO | WO99/19962 | | 4/1999 |
| WO | 9966624 A1 | * | 12/1999 |

OTHER PUBLICATIONS

Hughes, Austin, *Electric Motors and Drives*, Oxford 1993.

* cited by examiner stators A and B in phase stators A and B out of phase 30 degrees
1/6 full pole pitch stators A and B out of phase 60 degrees
1/3 full pole pitch stators A and B out of phase 90 degrees
1/2 full pole pitch

**stators A and B out of phase 120 degrees
2/3 full pole pitch**

**stators A and B out of phase 150 degrees
5/6 full pole pitch** w = slot width
D = stator outer diameter
d = stator inner diameter

T = tooth height
H = overall height

SELECTIVE ALIGNMENT OF STATORS IN AXIAL AIRGAP ELECTRIC DEVICES COMPRISING LOW-LOSS MATERIALS

RELATED U.S. APPLICATION DATA

This application claims the benefit of co-pending U.S. Provisional Application Ser. No. 60/496,368, filed Aug. 18, 2003, and entitled "Rotational Misalignment Of Stators In Axial Airgap Electric Devices Comprising Low-Loss Materials," which is incorporated herein in the entirety by reference thereto.

BACKGROUND OF THE INVENTION

1. Field of the Invention

The invention relates to a rotating, dynamoelectric machine; and more particularly, to an axial airgap machine comprising two or more stators, wherein the EMF generated in the machine is controlled through the selective rotational alignment of one or more of the stators relative to a reference one of the stators.

2. Description of the Prior Art

The electric motor and generator industry is continuously searching for ways to provide dynamoelectric, rotating machines with increased efficiencies and power densities. As used herein, the term "motor" refers to all classes of motoring and generating machines which convert electrical energy to rotational motion and vice versa. Such machines include devices which may alternatively be called motors, generators, and regenerative motors. The term "regenerative motor" is used herein to refer to a device that may be operated as either an electric motor or a generator. A wide variety of motors are known, including permanent magnet, wound field, induction, variable reluctance, switched reluctance, and brush and brushless types. They may be energized directly from a source of direct or alternating current provided by the electric utility grid, batteries, or other alternative source. Alternatively, they may be supplied by current having the requisite waveform that is synthesized using electronic drive circuitry. Rotational energy derived from any mechanical source may drive a generator. The generator's output may be connected directly to a load or conditioned using power electronic circuitry. Optionally, a given machine is connected to a mechanical source that functions as either a source or sink of mechanical energy during different periods in its operation. The machine thus can act as a regenerative motor, e.g. by connection through power conditioning circuitry capable of four-quadrant operation.

Rotating machines ordinarily include a stationary component known as a stator and a rotating component known as a rotor. Adjacent faces of the rotor and stator are separated by a small airgap traversed by magnetic flux linking the rotor and stator. It will be understood by those skilled in the art that a rotating machine may comprise plural, mechanically connected rotors and plural stators. Virtually all rotating machines are conventionally classifiable as being either radial or axial airgap types. A radial airgap type is one in which the rotor and stator are separated radially and the traversing magnetic flux is directed predominantly perpendicular to the axis of rotation of the rotor. In an axial airgap device, the rotor and stator are axially separated and the flux traversal is predominantly parallel to the rotational axis.

Except for certain specialized types, motors and generators generally employ soft magnetic materials of one or more types. By "soft magnetic material" is meant one that is easily and efficiently magnetized and demagnetized. The energy that is inevitably dissipated in a magnetic material during each magnetization cycle is termed hysteresis loss or core loss. The magnitude of hysteresis loss is a function both of the excitation amplitude and frequency. A soft magnetic material further exhibits high permeability and low magnetic coercivity. Motors and generators also include a source of magnetomotive force, which can be provided either by one or more permanent magnets or by additional soft magnetic material encircled by current-carrying windings. By "permanent magnet material," also called "hard magnetic material," is meant a magnetic material that has a high magnetic coercivity and strongly retains its magnetization and resists being demagnetized. Depending on the type of motor, the permanent and soft magnetic materials may be disposed either on the rotor or stator.

By far, the preponderance of motors currently produced use as soft magnetic material various grades of electrical or motor steels, which are alloys of Fe with one or more alloying elements, especially including Si, P, C, and Al. Most commonly, Si is a predominant alloying element. While it is generally believed that motors and generators having rotors constructed with advanced permanent magnet material and stators having cores made with advanced, low-loss soft materials, such as amorphous metal, have the potential to provide substantially higher efficiencies and power densities compared to conventional radial airgap motors and generators, there has been little success in building such machines of either axial or radial airgap type. Previous attempts at incorporating amorphous material into conventional radial or axial airgap machines have been largely unsuccessful commercially. Early designs mainly involved substituting the stator and/or rotor with coils or circular laminations of amorphous metal, typically cut with teeth through the internal or external surface. Amorphous metal has unique magnetic and mechanical properties that make it difficult or impossible to directly substitute for ordinary steels in conventionally designed motors.

Many applications in the electric motor and generator industry require a machine capable of operating significantly beyond a certain base rotational speed during at least part of its ordinary use. The base speed is the highest value attainable when an electric device is operated in a constant-torque mode. Above the base speed, the back EMF ordinarily exceeds a nominal supply voltage. However, design optimization is challenging for many applications in which the machine must operate at a wide range of speeds. The problem is especially acute for systems which do not incorporate a variable-ratio gearbox or other speed-matching device. For example, low-speed operation in an electric vehicle often requires constant-torque operation for moving heavy loads or traversing rough terrain or inclines, such as mountain trails, which normally are done at much less than a base speed. However, high-speed operation, e.g. for cruising on level roads or developed industrial sites, may require double or triple the base speed. For high-speed operation, torque requirements are generally low, and constant power operation, wherein the available torque is inversely proportional to the speed, would afford significant advantages.

A recognized disadvantage of typical permanent magnet machines is that the generated EMF of the machine is a direct linear function of the rotational speed of the machine. The generated EMF is also directly proportional to power output for a given current. Although greater power can be obtained at higher speeds, higher voltages are concomitantly produced during generating applications. Similarly, in motoring applications, the power supply voltage must be increased to go above the voltage need at the base speed. In either case, construction techniques and materials, particularly including insulation, and semiconductor and electronic elements in the control circuitry, must be selected accordingly. As a result, higher voltages are difficult if not impossible to control cost effectively. Thus a controlled and controllable generated EMF is a desirable feature in a machine, since speed limitations can be relaxed.

Prior art references have taught methods of maintaining a constant terminal voltage during operation of electric devices, based on manipulating the airgap between the rotor and the stator. A small decrease in the airgap results in an increase in the voltage (EMF) generated in the stator windings, and vice versa. U.S. Pat. Nos. 2,892,144 and 2,824,275 disclose a generator comprising a single stator positioned opposite a rotor, wherein the stator is mounted such that an increase in torque during operation ultimately causes motion of the stator towards the rotor, i.e., tending to reduce the airgap. An increased load (torque) that would ordinarily result in a drop in output voltage also causes a reduction in the airgap, which results in an increase in the voltage.

In an alternative embodiment, U.S. Pat. No. 2,824,275 discloses a generator comprising a single fixed stator positioned opposite a rotor, wherein the rotor is mounted such that an increase in speed during operation ultimately causes motion of the rotor away from the stator, i.e., tending to increase the airgap. As the output voltage is proportional to the speed, increasing speed would result in increasing voltage. However, an increasing airgap acts to reduce the voltage.

As another example of a manipulation of the airgap of a different type of electric device, U.S. Pat. No. 5,627,419 discloses a modified radial airgap flywheel with self-engaging means for automatically decreasing the adjustable airgap between the stator and the flywheel in response to electromagnetic torques exerted on the stator during spin-up or spin-down, as well as for increasing the adjustable airgap during freewheeling operation.

Other methods are known for controlling output parameters of electric devices during operation through manipulating the overlap between the rotor and the stator in radial airgap machines. As a method of maintaining constant speed during operation, U.S. Pat. No. 403,017 discloses using the centrifugal force on governors attached to the rotor of a radial airgap motor to reduce the axial overlap between the rotor and stator. A reduction of the load on the motor would normally result in an increase in the speed, but the increase in speed increases the centrifugal force on the governors, which causes an axial displacement of the rotor relative to the stator, thus reducing the overlap between rotor and stator. The reduced overlap between the rotor and stator results in reduced torque, which then counteracts the tendency for the increasing speed.

More recently, U.S. Pat. No. 6,555,941 discloses a method of reducing the back EMF of a radial airgap motor by axially displacing the rotor relative to the stator, hence reducing the overlap. As the rotor is offset into greater axial misalignment with the stator, the magnet flux on the stator field coils is reduced, thus reducing the back EMF that limits the speed. With the rotor misaligned, the motor operates in constant power mode, where the available torque is inversely proportional to the speed.

U.S. Pat. No. 6,194,802 also discloses a method of reducing the back EMF by reducing the overlap between the rotor and stator in an axial airgap motor. The rotor magnet blocks are mounted on the rotor such that an increase in speed during operation results in an increase in centrifugal force on the magnet blocks, causing them to move outwards from the center of the motor. This outwards motion results in a reduction in the overlap between the magnet block and the stator, thereby reducing flux linkage and the back EMF generated. Accordingly, the machine can rotate at higher speeds.

High speed (i.e., high rpm) electric machines are almost always manufactured with low pole counts, lest the magnetic materials in electric machines operating at higher frequencies experience excessive core losses that contribute to inefficient motor design. This is mainly due to the fact that the soft material used in the vast majority of present motors is a silicon-iron alloy (Si—Fe). It is well known that losses resulting from changing a magnetic field at frequencies greater than about 400 Hz in conventional Si—Fe-based materials causes the material to heat, oftentimes to a point where the device cannot be cooled by any acceptable means. A number of applications in current technology, including widely diverse areas such as high-speed machine tools, aerospace motors and actuators, and compressor drives, require electrical motors operable at high speeds, many times in excess of 15,000–20,000 rpm, and in some cases up to 100,000 rpm.

To date it has proven very difficult to cost effectively provide readily manufacturable electric devices, which take advantage of low-loss materials. Previous attempts to incorporate low-loss materials into conventional machines generally failed, since the early designs typically relied on merely substituting new soft magnetic materials, such as amorphous metal, for conventional alloys, such as silicon-iron, in machine's magnetic cores. The resulting electric machines have sometimes provided increased efficiencies with less loss, but they generally suffer from an unacceptable reduction in power output, and significant increases in cost associated with handling and forming the amorphous metal. As a result, they have not achieved commercial success or market penetration.

Thus, there remains a need in the art for highly efficient axial airgap electric devices, which take full advantage of the specific characteristics associated with low-loss material, thus eliminating the disadvantages associated with conventional axial gap machines. Ideally, an improved machine would provide higher efficiency of conversion between mechanical and electrical energy forms. Improved efficiency in generating machines powered by fossil fuels would concomitantly reduce air pollution. The machine would be smaller, lighter, and satisfy more demanding requirements of torque, power, and speed. Cooling requirements would be reduced. Motors operating from battery power would operate longer. In addition, there remains a need for devices that can operate efficiently in either constant torque mode, or, with suitable back EMF control, in constant power mode. Further desired are machines in which torque ripple and cogging, and concomitant electrical ripple, are reduced, e.g. by increased pole count.

SUMMARY OF THE INVENTION

The present invention provides an axial air-gap dynamoelectric machine comprising a first stator and a second stator and a rotor disposed axially between the stators and supported for rotation about an axis. The stators have respective first and second sets of windings positioned thereon. The second stator is selectively aligned with respect to the first stator such that the second stator is offset from the first stator. The stators comprise toroidal cores having laminated layers composed of a material selected from the group consisting of amorphous and nanocrystalline metals and optimized Fe-based alloy. In some embodiments, the alignment of the stators is adjustable by misalignment means.

The use of low core loss, advanced soft magnetic materials affords significant flexibility in design, since a wider range of pole counts and commutating frequencies are possible, while maintaining a wide range of possible operating speeds, high operating efficiency, and high power density.

In a further aspect, the windings of the stators are separately connected to respective first and second full-wave diode bridges. As a result of the offsetting of the stators, the waveforms of the individual windings are relatively phase-shifted. The bridge outputs are connected together to provide the DC bus voltage. The resulting waveform has reduced electrical current ripple compared to the waveform obtained without offset and with the plural stator waveforms series-connected, permitting filter circuitry to be simplified. The motor to be operated in a manner that permits the back EMF of the motor and/or the torque ripple produced during operation to be reduced.

The invention also provides techniques for reduction or elimination of torque ripple during operation of the electric device by controllably misaligning one or more stators of the device relative to a reference stator. In addition, a dual full wave diode bridge arrangement is disclosed to help in reducing current ripple on the DC bus of the electric machine.

In the prior art, a transmission with selectable or adjustable ear ratio has been employed to provide a shaft output speed higher than the maximum motor speed, which is generally limited by back electromotive force (back-EMF). A gear reduction allows higher output speed to be traded for lower available torque. On the other hand, inherent frictional losses in the transmission system, mechanical simplification, and reliability considerations provide a strong impetus for machines that avoid a transmission altogether. The method of misalignment of stators according to the present invention provides a motor that is able to shift from a constant torque mode to a constant power mode, i.e., operate at constant voltage, thereby providing speeds extending beyond a base speed without any transmission or gearing.

In still another aspect, there is provided an axial air-gap machine that comprises an axial air-gap dynamoelectric machine and power electronics means for interfacing and controlling the machine and being operably connected thereto.

Examples of electric machines that can be produced and operated in accordance with the invention include, but are not limited to, electric motors, generators, and regenerative motors. One or more of the electric devices could be a component in a composite device or system. An example of such a composite device is a compressor comprising one or more electric motors, where the one or more electric motors may be integral with the fan.

BRIEF DESCRIPTION OF THE DRAWINGS

The invention will be more fully understood and further advantages will become apparent when reference is had to the following detailed description of the preferred embodiments of the invention and the accompanying drawings, wherein like reference numeral denote similar elements throughout the several views and in which.

DESCRIPTION OF THE PREFERRED EMBODIMENTS

Figure 1:
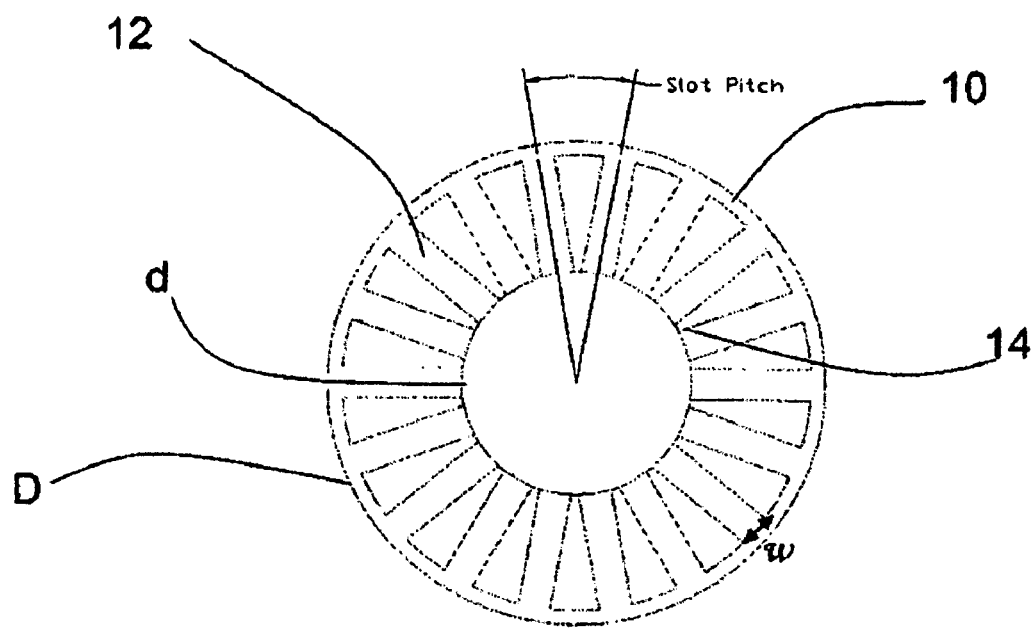
FIG. 1 illustrates a view of a face of an axial airgap type stator.

Preferred embodiments of the present invention will be explained in greater detail hereinafter, with reference to the accompanying figures.

In one aspect, the present invention relates to an axial airgap electric device, such as a brushless motor, having one or more rotors and two or more stators, the stators having magnetic cores made from a low-loss, soft magnetic material capable of high-frequency operation. Preferably, the stators' magnetic cores are made using material in the form of thin strip or ribbon consisting essentially of an amorphous or nanocrystalline metal, or an optimized Fe-base soft magnetic alloy. Grain-oriented and non-grain-oriented Fe-based materials, which have lower cores losses than the crystalline, Fe-based motor and electrical steels materials conventionally used in dynamoelectric machines, and which frequently have higher saturation induction than amorphous or nanocrystalline materials, are collectively referred to herein as "optimized Fe-based magnetic materials."

The inclusion of amorphous, nanocrystalline or optimized Fe-based magnetic material in the present electrical device enables the machine's frequency to be increased without a corresponding increase in core loss, thus yielding a highly efficient electric apparatus capable of providing increased power density. In addition, this ability to increase commutating frequency permits higher pole-count designs without reduction of the maximum allowable machine speed.

The one or more rotors can be permanent magnet-type rotors. However, other rotor types known in the art are also applicable in the practice of the present invention.

Amorphous Metals

Amorphous metals, which are also known as metallic glasses, exist in many different compositions suitable for use in the present motor. Metallic glasses are typically formed from an alloy melt of the requisite composition that is quenched rapidly from the melt, e.g. by cooling at a rate of at least about $10^{6°}$ C./s. They exhibit no long-range atomic order and have X-ray diffraction patterns that show only diffuse halos, similar to those observed for inorganic oxide glasses. A number of compositions having suitable magnetic properties are set forth in U.S. Pat. No. RE32,925 to Chen et al. Amorphous metal is typically supplied in the form of extended lengths of thin ribbon (e.g. a thickness of at most about 50 µm) in widths of 20 cm or more. A process useful for the formation of metallic glass strips of indefinite length is disclosed by U.S. Pat. No. 4,142,571 to Narasimhan. An exemplary amorphous metal material suitable for use in the present invention is METGLAS® 2605 SA1, sold by Metglas, Inc., Conway, S.C. in the form of ribbon of indefinite length and up to about 20 cm wide and 20–25 µm thick (see http://www.metglas.com/products/page5_1_2_4.htm). Other amorphous materials with the requisite properties may also be used.

Amorphous metals have a number of characteristics that must be taken into account in the manufacture and use of magnetic implements. Unlike most soft magnetic materials, metallic glasses are hard and brittle, especially after the heat treatment typically used to optimize their soft magnetic properties. As a result, many of the mechanical operations ordinarily used to process conventional soft magnetic materials for motors are difficult or impossible to carry out on amorphous metals. Stamping, punching, or cutting as-produced material generally results in unacceptable tool wear and is virtually impossible on brittle, heat-treated material. Conventional drilling and welding, which are often done with conventional steels, are also normally precluded.

In addition, amorphous metals exhibit a lower saturation flux density (or induction) than conventional Si—Fe alloys. The lower flux density ordinarily results in lower power densities in motors designed according to conventional methods. Amorphous metals also have lower thermal conductivities than Si—Fe alloys. As thermal conductivity determines how readily heat can be conducted through a material from a warm location to a cool location, a lower value of thermal conductivity necessitates careful design of the motor to assure adequate removal of waste heat arising from core losses in the magnetic materials, ohmic losses in the windings, friction, windage, and other loss sources. Inadequate removal of waste heat, in turn, would cause the temperature of the motor to rise unacceptably. Excessive temperature is likely to cause premature failure of electrical insulation or other motor components. In some cases, the over-temperature could cause a shock hazard or trigger catastrophic fire or other serious danger to health and safety. Amorphous metals also exhibit a higher coefficient of magnetostriction than certain conventional materials. A material with a lower coefficient of magnetostriction undergoes smaller dimensional change under the influence of a magnet field, which in turn would likely reduce audible noise from a machine, as well as render the material more susceptible to degradation of its magnetic properties as the result of stresses induced during machine fabrication or operation.

Despite these challenges, an aspect of the present invention provides a motor that successfully incorporates advanced soft magnetic materials and permits motor operation with high frequency excitation, e.g., a commutating frequency greater than about 400 Hz. Construction techniques for the fabrication of the motor are also provided. As a result of the configuration and the use of advanced materials, especially amorphous metals, the present invention successfully provides a motor that operates at high frequencies (defined as commutating frequencies greater than about 400 Hz) with a high pole count. The amorphous metals exhibit much lower hysteresis losses at high frequencies, which result in much lower core losses. Compared to Si—Fe alloys, amorphous metals have much lower electrical conductivity and are typically much thinner than ordinarily used Si—Fe alloys, which are often 200 µm thick or more. Both these characteristics promote lower eddy current core losses. The invention successfully provides a motor that benefits from one or more of these favorable attributes and thereby operates efficiently at high frequencies, using a configuration that permits the advantageous qualities of the amorphous metal, such as the lower core loss, to be exploited, while avoiding the challenges faced in previous attempts to use advanced materials.

Nanocrystalline Metals

Nanocrystalline materials are polycrystalline materials with average grain sizes of about 100 nanometers or less. The attributes of nanocrystalline metals as compared to conventional coarse-grained metals generally include increased strength and hardness, enhanced diffusivity, improved ductility and toughness, reduced density, reduced modulus, higher electrical resistance, increased specific heat, higher thermal expansion coefficients, lower thermal conductivity, and superior soft magnetic properties. Nanocrystalline metals also have somewhat higher saturation induction in general than most Fe-based amorphous metals.

Nanocrystalline metals may be formed by a number of techniques. One preferred method comprises initially casting the requisite composition as a metallic glass ribbon of indefinite length, using techniques such as those taught hereinabove, and forming the ribbon into a desired configuration such as a wound shape. Thereafter, the initially amorphous material is heat-treated to form a nanocrystalline microstructure therein. This microstructure is characterized by the presence of a high density of grains having average size less than about 100 nm, preferably less than about 50 nm, and more preferably about 10–20 nm. The grains preferably occupy at least 50% of the volume of the iron-base alloy. These preferred materials have low core loss and low magnetostriction. The latter property also renders the material less vulnerable to degradation of magnetic properties by stresses resulting from the fabrication and/or operation of a device comprising the component. The heat treatment needed to produce the nanocrystalline structure in a given alloy must be carried out at a higher temperature or for a longer time than would be needed for a heat treatment designed to preserve therein a substantially fully glassy microstructure. Representative nanocrystalline alloys suitable for use in constructing magnetic elements for the present device are known, e.g. alloys set forth in U.S. Pat. No. 4,881,989 to Yoshizawa and U.S. Pat. No. 5,935,347 to Suzuki et al. Such materials are available from Hitachi Metals and Alps Electric.

Preferably, the nanocrystalline metal is an iron-based material. However, the nanocrystalline metal could also be based on or include other ferromagnetic materials, such as cobalt or nickel.

Optimized Fe-Based Alloys

The present machines may also be constructed with optimized, low-loss Fe-based crystalline alloy material. Preferably such material has the form of strip having a thickness of less than about 125 μm, much thinner than the steels conventionally used in motors, which have thicknesses of 200 μm or more, and sometimes as much as 400 μm or more. Both grain-oriented and non-oriented materials may be used. As used herein, an oriented material is one in which the principal crystallographic axes of the constituent crystallite grains are not randomly oriented, but are predominantly correlated along one or more preferred directions. As a result of the foregoing microstructure, an oriented strip material responds differently to magnetic excitation along different directions, whereas a non-oriented material responds isotropically, i.e., with substantially the same response to excitation along any direction in the plane of the strip. Grain-oriented material is preferably disposed in the present motor with its easy direction of magnetization substantially coincident with the predominant direction of magnetic flux.

As used herein, conventional Si—Fe refers to silicon-iron alloys with a silicon content of about 3.5% or less of silicon by weight. The 3.5 wt. % limit of silicon is imposed by the industry due to the poor metalworking material properties of Si—Fe alloys with higher silicon contents. The core losses of the conventional Si—Fe alloy grades resulting from operation at a magnetic field with frequencies greater than about 400 Hz are substantially higher than those of low loss material. For example, in some cases the losses of conventional SiFe may be as much as 10 time those of suitable amorphous metal at the frequencies and flux levels encountered in machines operating under frequency and flux levels of the present machines. As a result, the conventional material under high frequency operation would heat to a point at which a conventional machine could not be cooled by any acceptable means. However, some grades of silicon-iron alloys, herein referred to as optimized Si—Fe, would be directly applicable to producing a high-frequency machine.

The optimized Fe-based alloys useful in the practice of the present invention include silicon-iron alloy grades comprising greater than 3.5% of silicon by weight, and preferably more than 4%. The non-grain-oriented Fe-based material used in constructing machines in accordance with the invention preferably consists essentially of an alloy of Fe with Si in an amount ranging from about 4 to 7.5 wt. % Si. These preferred alloys have more Si than conventional Si—Fe alloys. Also useful are Fe—Si—Al alloys such as Sendust.

More preferred non-oriented optimized alloys have a composition consisting essentially of Fe with about 6.5±1 wt. % Si. Most preferably, alloys having about 6.5% Si exhibit near-zero values of saturation magnetostriction, making them less susceptible to deleterious magnetic property degradation due to stresses encountered during construction or operation of a device containing the material.

The objective of the optimization is to obtain an alloy improved magnetic properties, including reduced magnetostriction and especially, core losses. These beneficial qualities are obtainable in certain alloys with increased silicon content made by suitable fabrication methods. In some cases, these optimized Si—Fe alloy grades are characterized by core losses and magnetic saturation similar to those of amorphous metal. However, alloys containing more than about 4 at. % Si are difficult to produce by conventional means because of their brittleness due to short-range ordering. In particular, conventional rolling techniques used to make conventional Si—Fe are generally incapable of making optimized Si—Fe. However, other known techniques are used to make optimized Si—Fe.

For example, one suitable form of Fe-6.5Si alloy is supplied as magnetic strips 50 and 100 μm thick by the JFE Steel Corporation, Tokyo, Japan (see also http://www.jfe-steel.co.jp/en/products/electrical/supercore/index.html).

Fe-6.5%Si produced by rapid solidification processing, as disclosed by U.S. Pat. No. 4,865,657 to Das et al. and U.S. Pat. No. 4,265,682 to Tsuya et al. also may be used. Rapid solidification processing is also known for preparing Sendust and related Fe—Si—Al alloys.

Rotor Materials

The rotor of the present machine can comprise any type of permanent magnet. Rare earth-transition metal alloy magnets such as samarium-cobalt magnets, other cobalt-rare earth magnets, or rare earth-transition metal-metalloid magnets, e.g., NdFeB magnets, are suitable. Alternatively, the rotor magnet structure comprises any other sintered, plastic-bonded, or ceramic permanent magnet material. Preferably, the magnets have high maximum BH energy product, high coercivity, and high saturation magnetization, along with a linear second-quadrant normal magnetization curve. More preferably, oriented and sintered rare earth-transition metal alloy magnets are used, since their higher energy product increases flux and hence torque, while allowing the volume of expensive permanent magnet material to be minimized. In alternate embodiments, the rotor includes one or more electromagnets.

Axial Airgap Electric Device Comprising Low-Loss Materials

The methods of the invention apply to electric devices comprising two or more stator structures positioned axially adjacent one or more rotor structures. In an illustrative embodiment comprising a single rotor and two stators, the stators are positioned on opposite sides of the rotor on a common axis. In preferred embodiments, the two or more stators comprise low-loss, high-frequency materials such as amorphous or nanocrystalline metals, or optimized Fe-based alloy, grain-oriented Fe-based, or non-grain-oriented Fe-based material.

The stator preferably includes a metal core formed by spirally winding low-loss, high-frequency strip material into a toroid. This toroid has the shape of a generally right circular cylindrical shell having an inner diameter and an outer diameter when viewed in the axial direction. The annular end surface region extending radially from the inner to the outer diameter, and circumferentially about the full toroid, defines a surface area. The metal core extends axially, defining a toroid height. The wound core is thereafter machined with slots, that are generally radially directed, to form the stator. The depth of the slots extends axially only part-way through the toroid height. The slots reduce the total end surface area of the metal core. FIG. 1 illustrates a view of a face of stator 10, showing the inner diameter (d) and outer diameter (D) of the stator. Also illustrated are stator slots 12 of outer width (w) that are machined into the metal core to form the stator. The portion of the annular region left after the removal of the slots is the total area (TA), also referred to as the amorphous metal area (AMA) for the embodiments in which the low-loss, high-frequency material is an amorphous metal. Because the slots extend from the inner diameter d to the outer diameter D, the stator core's inside diameter d in the slotted portion of the toroid is not continuous. After the slot spaces have been removed, the remaining part of the core annular region extending to the slot depth, is called a tooth 14. There are an equal number of teeth and slots.

The slots 12 are wound with conducting stator windings (not shown in FIG. 1) according to a winding scheme preselected for a given electric device design. A preferred winding scheme entails one coil per tooth 14. Each coil ordinarily comprises multiple turns of conductive wire. This configuration provides the least amount of stator misalignment required to achieve the maximum benefit according to the methods of the present invention. However, any winding arrangement known in the art is applicable.

Stator constructions suitable for use in the practice of the present invention are also provided by commonly assigned U.S. application Ser. No. 10/769,094, filed Jan. 30, 2004, which application is incorporated herein in the entirety by reference thereto.

Figure 33A:
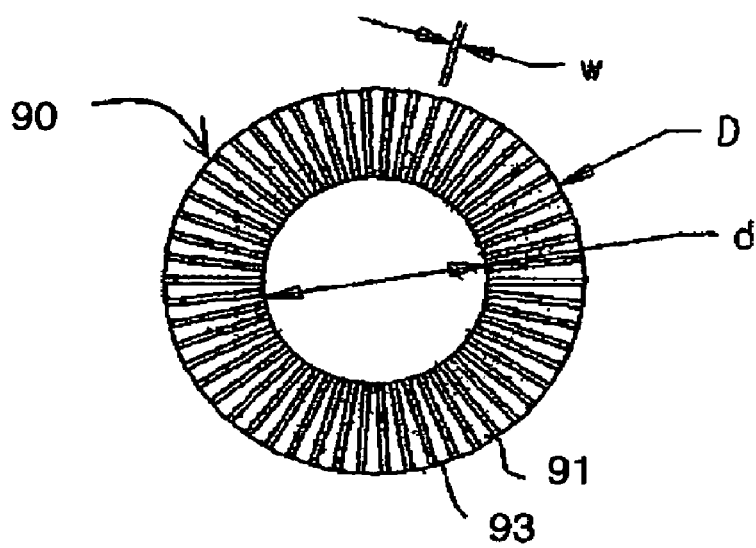
FIGS. 33A and 33B depict in plan and side elevation views, respectively, a stator structure useful in the practice of the present invention.
Figure 33B:
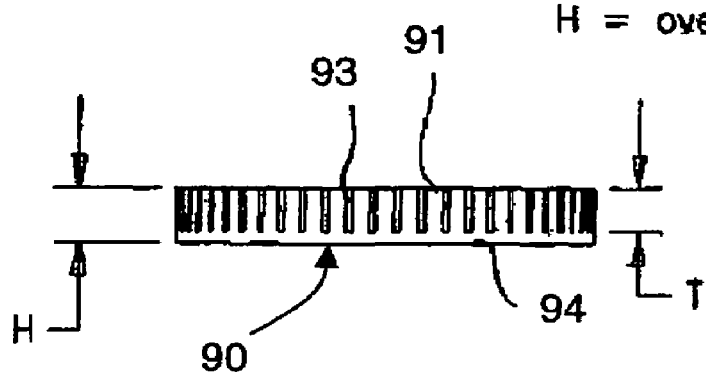

FIGS. 33A and 33B illustrate a top and side view, respectively, of a stator according to one embodiment of the invention. A ribbon of the advanced low-loss material is wound into a large toroid to form the stator metal core 90. These ribbons are typically 0.10 mm (0.004") or less in thickness. The toroid wound from the ribbon has an inside diameter and an outer diameter when viewed in the axial direction, which inside and outside diameters define a surface area known as the total area (TA). The metal core is then machined with slots 93 to form a unitary magnetic core of the stator. The slots reduce the surface area of metal core.

FIG. 33A illustrates the inner diameter (d) and outer diameter (D) of the stator core 90 and also illustrates the slots 93 of outer width (w) that have been machined into the metal core 90 to form the stator. The surface area left after the removal of the slots is called the low-loss metal area. In preferred embodiments where the low-loss material is an amorphous metal, the low-loss metal area is also referred to as the amorphous metal area (AMA). The metal core has an inside circumference that defines inner diameter (d). The inside circumference is not continuous on the slotted portion. Instead, the inside circumference that traverses the slots has gaps where the slots are located. These slots are designed to hold stator windings. Each of the remaining portions of the core inside circumference (i.e., the individual extensions from the backiron 94) is called a tooth 91.

FIG. 33B shows the height (T) of the teeth 91 as it compares to the overall height (H) of the stator 90. The overall height includes the height of the backiron 94 plus the height of the teeth 91. There are equal numbers of teeth 91 and slots 93. In preferred embodiments, the narrowest part of a tooth is not less than 0.100 inch. The area that is removed when the stator is slotted can be filled with potting and/or varnish compounds, or thin organic insulation materials, along with the conducting stator winding, as is known in the art.

Figure 2:
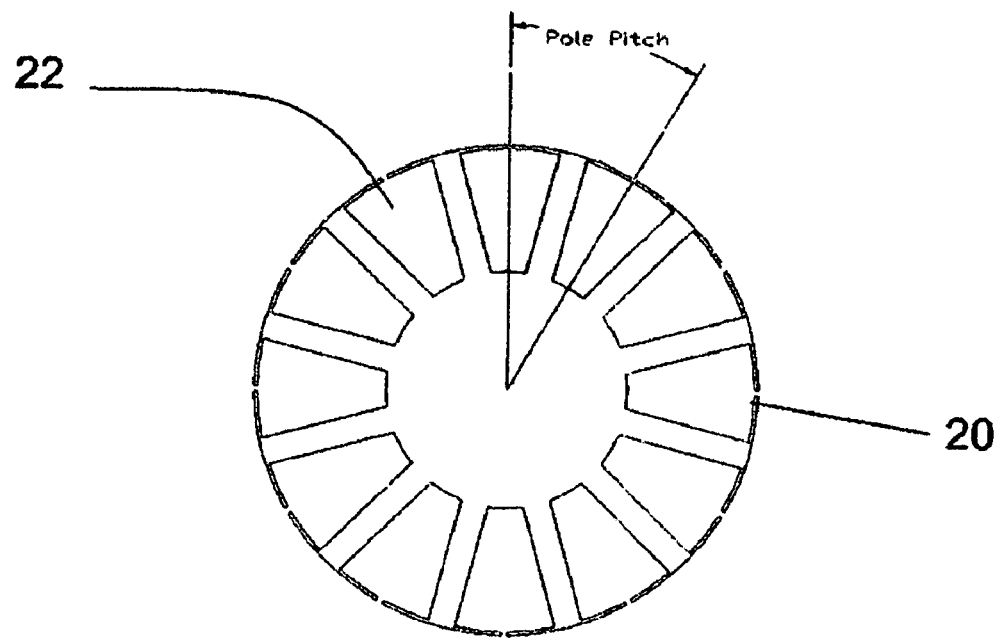
FIG. 2 illustrates a view of a face of an axial airgap type rotor.

FIG. 2 illustrates a view of a face of an axial type rotor structure that is positioned for rotation between the two or more stators of the electric device. The rotor and stators are substantially coaxial. In preferred embodiment, the rotor 20 comprises a plurality of magnets 22, possessing alternating polarity and positioned and spaced circumferentially about the rotor. Different parameters of the rotor magnets, such as position, angle, skew, shape, etc., could be varied as known in the art. However, the methods of the present invention still apply to the resulting electric device.

In a preferred embodiment, the rotor comprises a plurality of permanent magnets. In some embodiments, the rotor magnets extend through the thickness of the rotor, while in others, they do not. Preferably, the rotor arrangement is a disk or axial type rotor including circumferentially spaced-apart, high energy product permanent magnets, e.g., rare earth-transition metal or rare earth-transition metal-metalloid magnets, such as SmCo, iron rare earth (NdFeB), or iron-cobalt rare earth magnets (NdFe,CoB), each having opposite ends defining north and south poles. The rotor 20 and its magnets 22 are supported for rotation about a motor axis, e.g., on a shaft or any other suitable arrangement such that the poles of the magnets are accessible along a predetermined path adjacent the two or more stators. Ordinarily the shaft is supported by bearings of any suitable type known for rotating machines. The magnet area on the rotor has an outer diameter and an inner diameter. In a preferred embodiment, for an axial airgap type rotor, the outer diameter and inner diameter of the magnets 22 are substantially identical to those of the stators 10. If the outer diameter of the magnets 22 is greater than that of the stators 10, then the outer portion of the rotor does not contribute appreciably to performance. If the outer diameter of the rotor 20 is smaller than that of the stators 10, the result is a reduction in performance of the electric device. In either case, some of the hard or soft magnetic material present in the machine increasing cost and weight, but without improving performance. In some cases, the extra material even diminishes performance of the machine.

Slot Per Phase Per Pole Ratios

In the present description, a pole refers to the non-time-varying magnetic field, also referred to herein as a DC field, that interacts with a changing magnetic field, i.e., one that varies in magnitude and direction with both time and position. Therefore, in the preferred embodiments, the permanent magnets mounted on the rotor provide the DC field, and hence the number of non-time-varying magnetic poles, referred to herein as DC poles. In other embodiments, a DC electromagnet can provide the DC field. The electromagnets of the stator windings provide the changing magnetic field, i.e., one that varies with both time and position.

The slot per phase per pole (SPP) value of an electric machine is determined by dividing the number of stator slots 12 by the number of phases in the stator winding and the number of DC poles (SPP=slots/phases/poles). In the calculation of the SPP value, a pole refers to the DC field that interacts with a changing magnetic field. A slot refers to the spacing between alternating teeth of the stator of the present machine.

The techniques of the present invention are applicable to electric devices with any SPP value. Beneficially, the design of the present machine affords considerable flexibility in the selection of an optimal SPP ratio. In preferred embodiments, the permanent magnets 22 provide the DC field, and hence the number of DC poles. In other embodiments, a DC electromagnet structure provides the DC field. The electromagnets of the stator windings provide the changing magnetic field, i.e., one that varies with both time and position.

Conventional machines are frequently designed to have an SPP ratio of 1 to 3 to obtain acceptable functionality and noise levels and to provide smoother output due to better winding distribution. However, designs with a lower SPP value, e.g. 0.5, have been sought to reduce the effect of end turns. End turns are the portions of wire in the stator that connect the windings between slots. Although such connection is, of course, required, the end turns do not contribute to the torque and power output of the machine. In this sense they are undesirable, in that they increase the amount of wire required and contribute ohmic losses to the machine while providing no benefit. Hence, one goal of the motor designer is to minimize end turns and provide a motor with manageable noise and cogging. On the other hand, preferred implementations of the present motor allow reduced SPP ratio, along with desirably low noise and cogging. Such a benefit is obtained by operating with a high pole and slot count. These options were not viable in previous machines, because the required increase in commutating frequency is unacceptable without the use of advanced, low loss stator materials.

For some applications, it is advantageous to build a motor with a fractional value of SPP, since such a motor may employ pre-formed coils disposed around a single stator tooth. In different embodiments of the present machine, the SPP ratio is an integral ratio, such as 0.25, 0.33, or 0.5. SPP values of, 1.0, or even greater than 1.0 are also possible. Preferably, SPP values range from about 0.25 to 4.0. However, more preferred embodiments of the present machine are beneficially designed with an SPP ratio of 1 or less, and even more preferably 0.5 or less. It is possible to wire multiple slots into a common magnetic section, thereby providing an SPP greater than 0.5. This is the result of there being a greater number of stator slots than rotor poles, resulting in a distributed winding. A value of SPP less than or equal to 0.5 indicates that there are no distributed windings. A convention in the industry is to include distributed windings in the stator. Ordinarily, prior art machines designed with distributed windings have many slots per pole, resulting in lower frequency operation. As a result, in conventional machines that have SPP of 0.5 or less, and operate at low frequency, there will also be a low pole count and high, difficult to control cogging. On the other hand, the use of advanced magnetic materials in the present machine permits the commutating frequency to be raised, so that low SPP values can be maintained, while still minimizing cogging and without reducing the machine speed. However, while the methods of the present invention are applicable to an electric device with SPP values below 0.5 (e.g. 0.25), practical considerations sometimes make such a configuration less desirable, including increased machine reactance at the higher commutating frequency required, somewhat increased leakage flux from the rotor magnets, and the mechanical support needed to accommodate the rotor magnets which are smaller and numerous. often is less advantageous for other important parameters of the electric device.

On the other hand, increasing the SPP value effectively increases the pole pitch of the machine. For example, multiple stator slots 12 can be wired into a common magnetic section, which corresponds to a slot per phase per pole (SPP) value greater than 0.5. While such a configuration is applicable in the practice of the invention, the amount of stator movement that is desirable increases, which would be a disadvantage in some applications.

Although the present machine may be designed and operated as a single-phase device, or a polyphase device with any number of phases and a commensurate number of windings on each of the stators, a three-phase machine with three-phase windings is preferred in accordance with industry convention and provides efficient utilization of both hard and soft magnetic materials, along with good power density. Embodiments with SPP ratios of 0.5 are particularly suited for three-phase applications. For example, in a three-phase machine, with a slot/pole/phase ratio=0.5, the number of rotor poles is two-thirds the number of stator slots, with the number of slots being a multiple of the number of phases. While the machine is usually wired in three-phase wye configuration in accordance with industry convention, a delta-configuration may also be employed.

High Pole Count, High-frequency Design using Low Loss-Materials

In specific embodiments, the present invention also provides a axial airgap electric device with a high pole count that operates at high frequencies, i.e., a commutating frequency greater than about 400 Hz. In some cases, the device is operable at a commutating frequency ranging from about 500 Hz to 3 kHz or more. Designers ordinarily have avoided high pole counts for high speed motors, since conventional stator core materials, such as Si—Fe, cannot operate at the proportionately higher frequencies necessitated by the high pole count. In particular, known devices using Si—Fe cannot be switched at magnetic frequencies significantly above 400 Hz due to core losses resulting from changing magnetic flux within the material. Above that limit, core losses cause the material to heat to the point that the device cannot be cooled by any acceptable means, Under certain conditions, the heating of the Si—Fe material may even be severe enough that the machine cannot be cooled whatsoever, and will self-destruct. However, it has been determined that the low-loss characteristics of amorphous, nanocrystalline and non-grain-oriented metals allow much higher switching rates than conventional Si—Fe materials. While, in a preferred embodiment, the choice of amorphous metal alloy, such as METGLAS® 2605SA1 alloy, removed the system limitation due to heating at high frequency operation, the rotor design and overall motor configuration have also been improved to better exploit the properties of the amorphous material.

The ability to use much higher exciting frequencies permits the present machines to be designed with a much wider range of possible pole counts. The number of poles in the present devices is a variable based on the permissible machine size (a physical constraint) and on the expected performance range. Subject to allowable excitation frequency limits, the number of poles can be increased until magnetic flux leakage increases to an undesirable value, or performance begins to decrease. There is also a mechanical limit presented by stator construction on the number of rotor poles, since stator slots must coincide with the rotor magnets. In addition, there is a mechanical and electromagnetic limit in concert on the number of slots that can be made in the stator, which in turn is a function of the frame size of the machine. Some boundaries can be set to determine the upper limits of slot number for a given stator frame with proper balance of copper and soft magnetic material, which can be used as a parameter in making good performing axial gap machines. The present invention provides motors with about 4 or 5 times greater numbers of poles than industry values for most machines.

As an example, for an industry typical motor having 6 to 8 poles, for motors at speeds of about 800 to 3600 rpm, the commutating frequency is about 100 to 400 Hz. The commutating frequency (CF) is the rotating speed multiplied by the number of pole pairs, where the pole pairs is the number of poles divided by two, and the rotating speed is in units of revolutions per second (CF=rpm/60×pole/2). Also available in industry are devices with 16 or more poles, but speeds of less than 1000 rpm, which still correspond to a frequency less than 400 Hz. Alternatively, motors are also available with a relatively low pole count (e.g. less than 6 poles), and with speeds up to 30000 rpm, which still have a commutating frequency less than about 400 Hz. In representative embodiments, the present invention provides machines that are 96 poles, 1250 rpm, at 1000 Hz; 54 poles, 3600 rpm, at 1080 Hz; 4 poles, 30000 rpm, at 1000 Hz; and 2 poles, 60000 rpm, at 1000 Hz. The high frequency motors of the invention can operate at frequencies of about 4 to 5 times higher than known axial airgap motors made with conventional materials and designs. The present motors are more efficient than typical motors in the industry when operated in the same speed range, and as a result provide greater speed options. The present configuration is particularly attractive for the construction of very large motors. Using a combination of a high pole count (e.g. at least 32 poles) and a high commutation frequency (e.g. a frequency of 500 to 2000 Hz), very large machines can be constructed in accordance with the invention in a manner that combines high energy efficiency, high power density, ease of assembly, and efficient use of expensive soft and hard magnetic materials.

Thermal Properties

One of the characteristics that limits device output efficiency in all electric machines, including both those using conventional Si—Fe alloys and those using amorphous, nanocrystalline, optimized Si—Fe alloy, grain-oriented Fe-based or non-grain-oriented Fe-based metals, is the loss of energy to waste heat. This waste heat comes from a number of sources, but predominantly from ohmic losses, skin and proximity effect losses in the windings, rotor losses from eddy currents in magnets and other rotor components, and core loss from the stator core. Because of the large amounts of waste heat generated, conventional machines soon reach the limit of their ability to discard the waste heat. The "continuous power limit" of conventional machines is often determined by the maximum speed at which the machine can operate continuously while still dissipating all of the waste heat that is generated. The continuous power limit is a function of the current.

In the high-frequency, high pole count electric devices optimally applicable in the practice of the present invention, less waste heat is generated because the amorphous, nanocrystalline, optimized Si—Fe alloy, grain-oriented Fe-based materials or non-grain-oriented Fe-based materials have lower losses than conventional Si—Fe. The designer can exploit the low loss characteristics of these materials by increasing the frequency, speed and power, and then correctly balancing and "trading" the low core loss versus the ohmic loss. Overall, for the same power as conventional machines, the high-frequency, high pole count electric devices optimally applicable in the present invention exhibits lower loss, and hence higher torques and speeds, and can thus achieve higher continuous speed limits than conventional machines.

Improved Efficiency

One advantage of the high-frequency, high pole count electric devices optimally applicable in the present invention is the ability to maximize the device's efficiency while maintaining cost effectiveness. The efficiency is defined as the useful power output of the device divided by the power input. The high-frequency, high pole count electric devices optimally applicable in the present invention operate simultaneously at higher commutating frequencies with the high pole count, resulting in a more efficient device having low core losses and high power density. The high frequency limit of 400 Hz is an industry standard beyond which there are few, if any practical applications.

The performance and increased efficiency of the high-frequency, high pole count electric devices optimally applicable in the present invention is not simply an inherent feature of replacing conventional Si—Fe with amorphous metal. A number of designs have been proposed, but have met with performance failure (including overheating and lower output power). This failure is believed to have arisen in large measure as a result of merely applying new materials (e.g., amorphous metals) and production methods in manners that were designed for, and suitable to, a conventional material (Si—Fe containing 3.5% or less of Si by weight). The early performance failure, combined with the perceived cost of the amorphous metal processing into motors, caused all companies in the industry to abandon the research.

The high-frequency, high pole count electric devices optimally applicable in the present invention overcome the performance failures of the prior art through the design of a rotating electric device that exploits the amorphous, nanocrystalline, optimized Si—Fe alloy, grain-oriented Fe-based or non-grain-oriented Fe-based materials' properties. Also provided are construction methods compatible with the physical and mechanical characteristics of the various improved materials. These designs and method provide machines that possess some or all of various advantageous qualities, including operating at commutating frequencies greater than 400 Hz, with a high pole count, at high efficiency and with a high power density. While other conventional methods have been able to provide motors with at most one or two of the four qualities, among the embodiments provided herein are high-frequency, high pole count electric devices that exhibit some, and preferably all of, the four qualities simultaneously.

In many embodiments, the present high-frequency, high pole count electric machines beneficially exhibit high efficiency losses. A major contribution to the improvement results from significantly reduced hysteresis losses. As is known in the art, hysteresis losses result from impeded domain-wall motion during the magnetization of all soft magnetic materials. Such losses are generally higher in conventionally used magnetic materials, such as conventional grain-oriented Si—Fe alloys and non-oriented motor and electrical steels, than in the improved materials preferably employed in the present machines. High losses, in turn, can contribute to the overheating of the core. As a result of the increased efficiency, the high-frequency, high pole count electric devices optimally applicable in the present invention are capable of achieving a greater continuous speed range. Conventional motors are limited in that they can either provide low torque for high-speed ranges (low power), or high torque for low-speed ranges. The high-frequency, high pole count electric devices optimally applicable in the present invention successfully provide electric devices with high torque for high-speed ranges.

Misalignment of Stators

In an aspect of the present invention there are provided methods of selectively controlling one or more rotatable stators of the electric machine relative to one or more reference stators. By "selective alignment" or "misalignment" is meant an angular displacement or offset of the teeth and slots of one or more rotatable stators of the present machine with respect to the corresponding teeth and slots of the one or more reference stators, with the reference and rotatable stators and the associated rotors are all disposed coaxially. In some embodiments, the one or more reference stators of a machine are disposed in a fixed position relative to the housing of the machine, which in turn is ordinarily secured to additional elements of the mechanical system to which the machine is connected. Alternatively, both the reference and rotatable stators may be made angularly rotatable with respect to the housing to effect the desired misalignment. In either alternative, the misalignment is to be understood as being measured relatively between the stators, and not with reference to the motor frame or housing.

The present selective alignment methods are particularly applicable to axial air gap motors and generators. The controlled misalignment of the one or more rotatable stators of the electric machine results in regulation of different parameters of the electric machine. For example, the stator configuration may be adaptively adjusted to maintain a substantially constant voltage characteristic, or to reduce or substantially eliminate torque ripple.

In the methods of the invention, at least one of the stators in an axial airgap machine is intentionally caused to be axially rotated relative to a reference stator about their common axis, resulting in a rotational misalignment (i.e., one stator is azimuthally "offset" with respect to the other stator). As a result, the sinusoidal waveforms (i.e., sine or near-sine) of the field pattern of the intentionally misaligned stators are not synchronized, (i.e., are not in optimal, substantially coincident electrical phase), at the position of the rotor. As the generated EMF is a function of the superposition of the sinusoidal waveforms generated by the stators, any change in the superimposed generated waveforms leads to a change in the generated EMF characteristics of the electrical device.

Although many embodiments of the invention are illustrated by an electric device comprising one rotor and two stators, the methods of the invention are applicable to electric devices that comprise any number of stators and that share any number of rotors. For example, the machine may comprise two rotors on a common shaft, each being located between axially adjacent stators, with their teeth facing the respective opposite sides of the rotor therebetween. In some of these embodiments the rotors are joined on a common shaft.

Rotor Pole Pitch and Stator Slot Pitch

The desired degree of misalignment of the stators in the various embodiments of the methods of the invention is defined relative to either a pole pitch of the rotor or a slot pitch of the stator. A slot pitch is defined as the rotational distance between the centers of adjacent stator electrical slots. FIG. 1 illustrates a slot pitch for a stator with 18 electrical slots. A slot pitch is conventionally measured in degrees, however, radians or other desired units of angular measurement known in the art are also applicable.

A pole pitch is defined as the rotational distance measured between the centers of adjacent rotor magnetic poles. FIG. 2 illustrates a pole pitch for a rotor comprising 12 rotor magnets. While a pole pitch is also conventionally expressed in the units of degrees, radians or other desired units of angular measurement known in the art are also applicable.

Both pole pitch and stator pitch may be specified in either mechanical or electrical angular units, such as degrees. Electrical degrees are measured relative to the period of each cycle of commutation, during which the machine shaft (in synchronous operation) rotates by a full revolution in a two-pole machine or a fraction thereof in machines having more than 2 poles. Most commonly, misalignment in applications wherein torque ripple and cogging are to be minimized are measured in mechanical degrees based on slot pitch. Applications wherein back EMF is to be controlled employ mechanical degrees based on pole pitch to measure the stator misalignment actuation but electrical degrees for the desired electrical response. DC bus ripple minimization applications are ordinary specified in electrical degrees relative to pole pitch, based on one half of the natural 6:1 ratio of DC bus ripple frequency to commutating frequency.

In the practice of the invention at least one stator is designated a reference stator. That is to say, the degree of misalignment of the one or more rotatable stators is measured relative to the reference stator. In some embodiments of the invention, the one or more reference stators are kept fixed, while the one or more rotatable stators are allowed to rotate by a desired amount relative to the one or more reference stators. The amount of this relative rotation can be from 0 degrees (minimum) to one full pole pitch (maximum), or one full slot pitch (maximum), depending on the degree of misalignment desired. Also provided are embodiments wherein both the one or more reference stators and the one or more rotatable stators move to achieve the desired amount of rotational misalignment, i.e., relative phase differences.

Some embodiments of the present dynamoelectric machine employ more than two stators and one rotor. In such machines, at least one stator is designated as the reference stator, and the other stators are rotatable stators that can be commonly aligned but offset from the reference stator. More preferably, the rotatable stators are independently alignable. Although an alignment means in such an embodiment would require separate actuation systems for each adjustable stator, additional flexibility would ensue. For example, in a two-rotor, four-stator embodiment, three stators could be offset from the reference by a common preferred amount to reduce torque cogging. To control back EMF, the rotatable stators could be adaptively controlled to achieve the best reduction consistent with required acceleration response, as might be desired in a traction motor or regenerative motor application. In a machine wherein DC bus electrical ripple is to be minimized, the additional degrees of freedom permit selection of a misalignment pattern that results in greater destructive interference between the DC contributions from the various stators than is possible in an optimized two stator, one rotor implementation.

Maintaining Constant Terminal Voltage

Parallel electrical connections of the stator windings is possible, but ordinarily not preferred for practicing the present invention. One waveform, e.g., waveform 30, generally has a different (higher or lower) voltage than the other, waveform 32, at any instant in time. Therefore there is a high likelihood that significant current would flow in a parallel connection from one stator to the other. Such a current is known as a circulating current. Its presence causes power losses and internal heating. Circulating currents do not provide any useful torque and in some instances can be harmful to an electric device. Nevertheless, parallel connection of the stator windings is not prohibited according to the present invention.

In the preferred embodiments of the invention, the windings of the two or more stators are electrically connected in series, and as a result, their electrical waveforms are mathematically additive. As illustrated in FIGS. 3–9, in which waveforms 30 and 32 corresponding to two stator windings are connected in series, the resulting voltage at any instant in time (i.e., waveform 34) is the sum of the instantaneous voltages of the two respective waveforms at that instant. As is known in the art, the addition of two exactly sine-curve waveforms that have the same frequency but different phase results in another sine curve of the same frequency, but shifted in phase from the constituent waveforms.

In an aspect, the invention provides techniques for operating an electric machine so that constant terminal voltage is maintained. One implementation of these techniques is illustrated in terms of an electric device comprising two stators positioned opposite a single rotor. The graphs of FIGS. 3 through 9 illustrate the results of the superposition of waveforms from the two stators, which are misaligned by different amounts of offset. In the illustration, one stator is taken to be fixed (stator A) while the other is rotatable (stator B). In each of FIGS. 3 through 9, the waveform from stator A is labeled 30, while the waveform from stator B is labeled 32. The superposition (addition) of the two waveforms is labeled 34.

Figure 9:
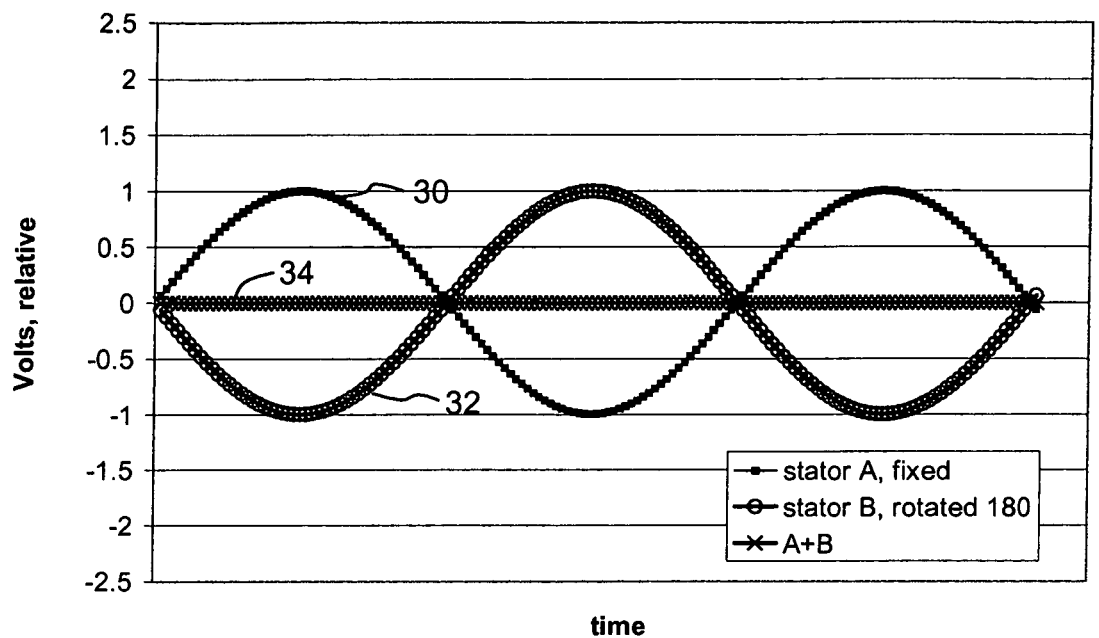

During constant voltage operation, the generated EMF ranges with increasing speeds between 100% base voltage for 0% pole pitch misalignment, and 0% of base voltage at 100% pole pitch misalignment. Thus, for convenience, the degree of misalignment is expressed in terms of pole pitch for the one or more stators. The degree of misalignment is expressed in fractions of a full pole pitch, varying from no misalignment (FIG. 3) up to one full pole pitch misalignment (FIG. 9). Intermediate values of misalignment result in the waveforms of FIGS. 4–8, for misalignments of 30, 60, 90, 120, 150, and 180° electrical, respectively.

Figure 3:
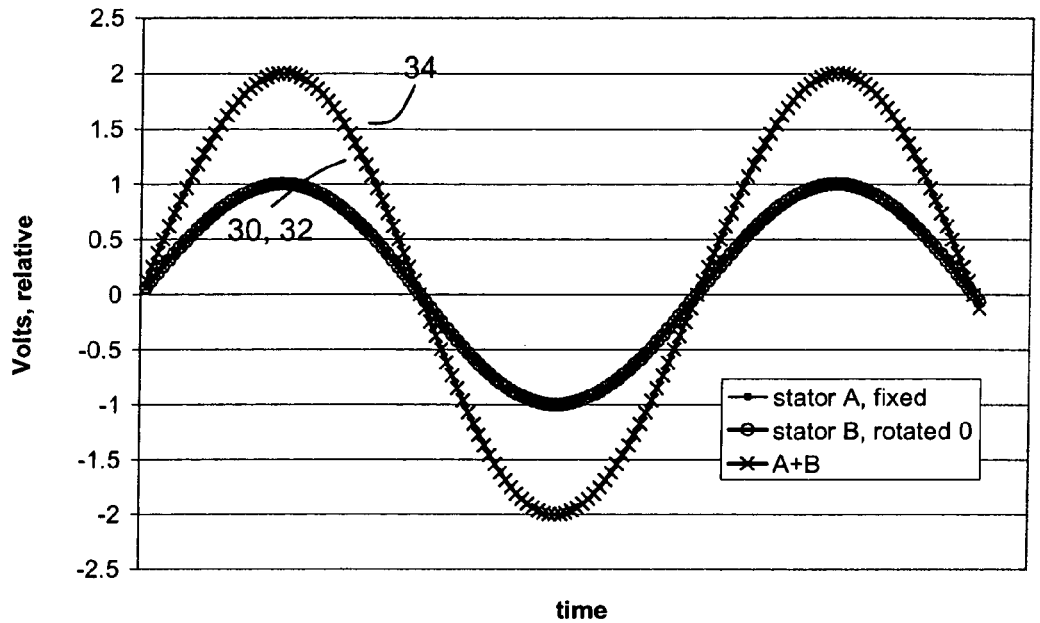
FIGS. 3 through 9 illustrate the results of the superposition of sinusoidal waveforms from two series connected stators at the position of the rotor for different degrees of misalignment between the two stators.
Figure 4:
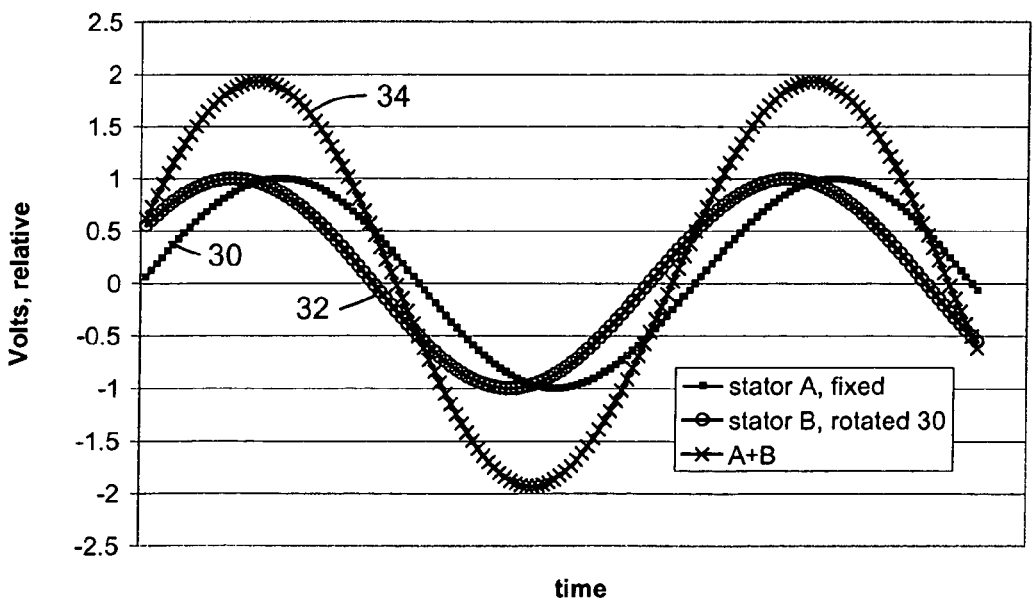
Figure 5:
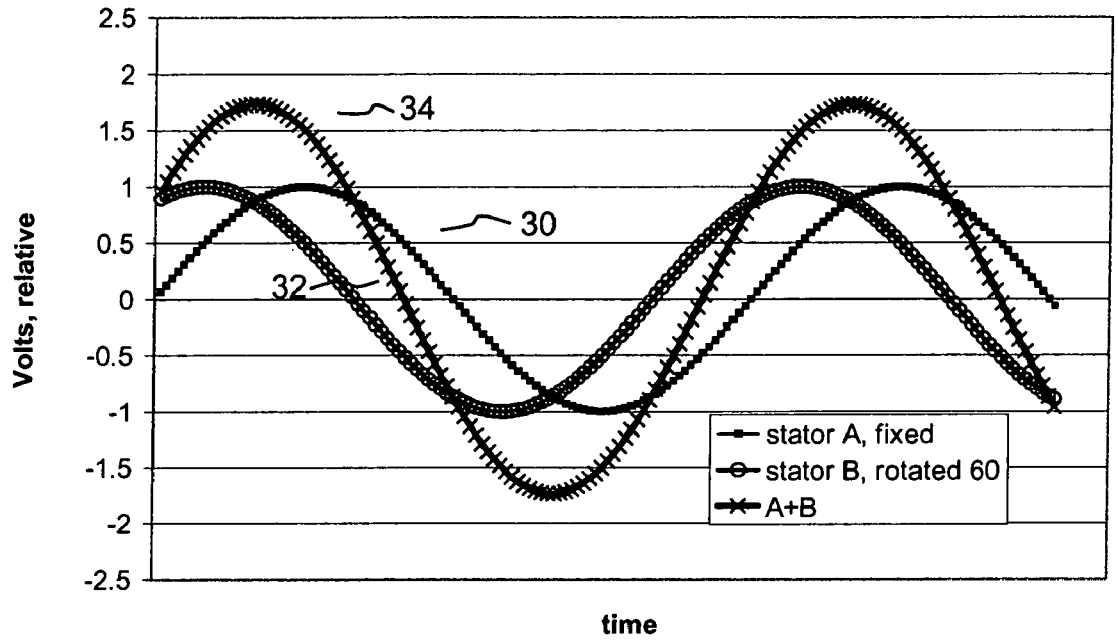
Figure 6:
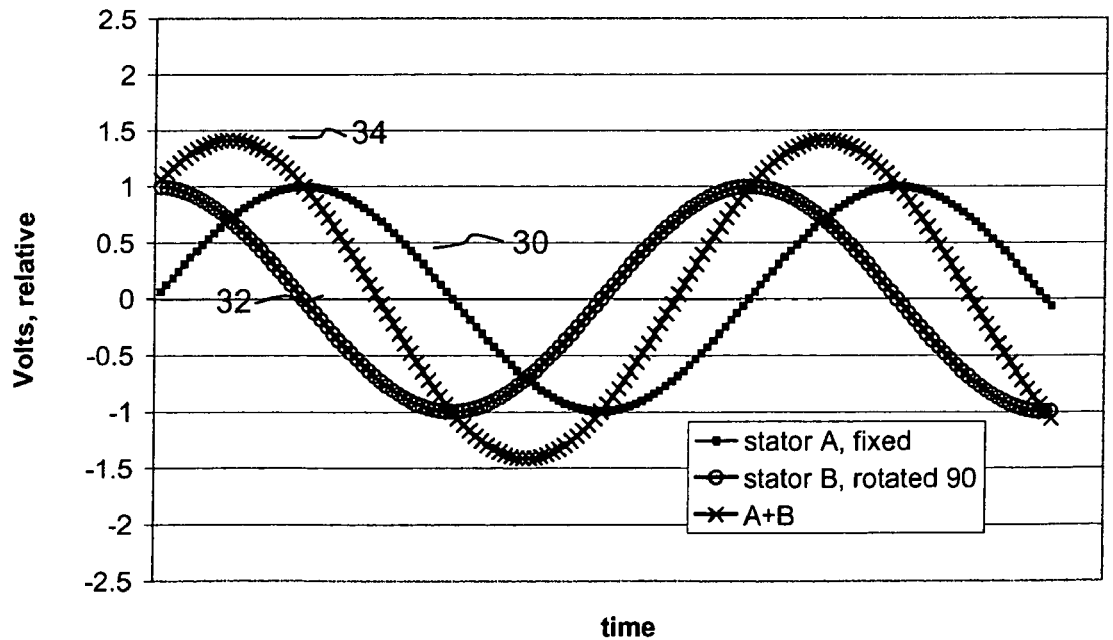

FIG. 3 illustrates a representative example of the superposition of the substantially identical waveforms 30, 32 for each stator when there is minimal or no misalignment. Because the relative rotation of the stators is zero, both stators are 100% in phase. The waveforms 30 and 32 of the contribution from each of the two stators are substantially coincident and add constructively to produce waveform 34. The machine generated EMF is therefore also a maximum, since the waveforms from the stators add constructively to produce the in-phase, synchronized sinusoidal waveform 34 with maximum (approximately doubled) amplitude, indicating maximum flux contribution of the stators at the position of the rotor.

Figure 7:
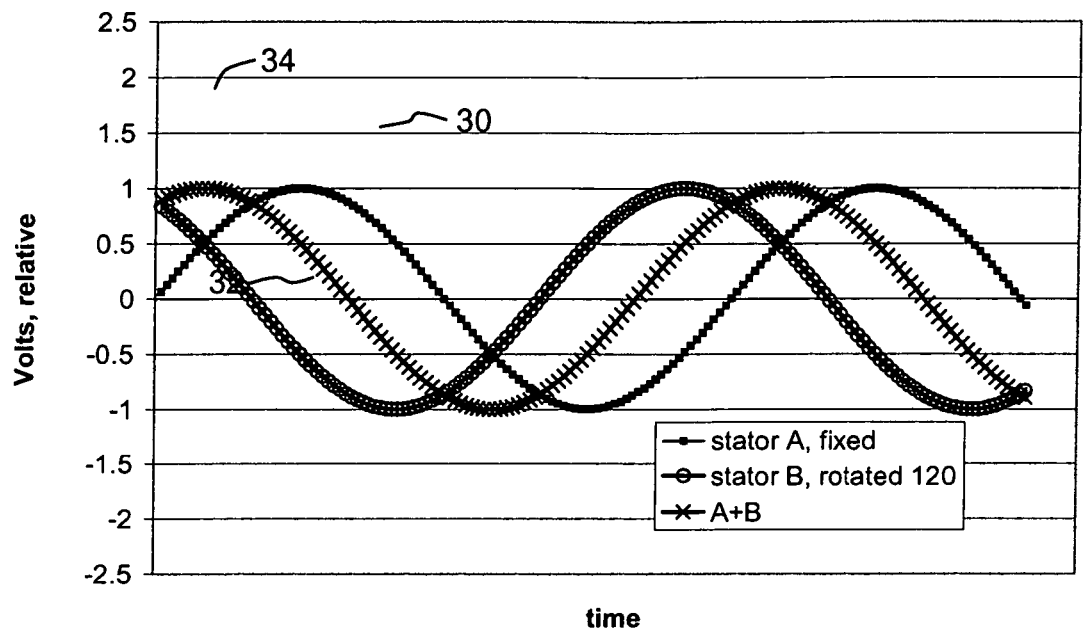
Figure 8:
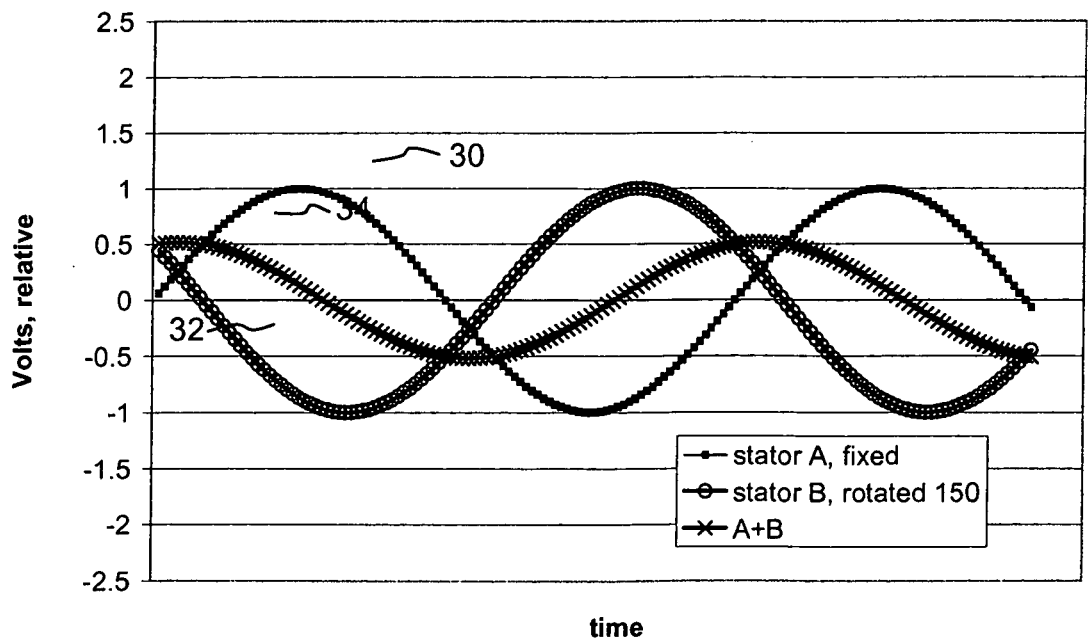

As the rotatable stator (stator B) is rotated out of phase relative to the reference stator, the superposition of the waveforms from the two stators adds to less than the maximum value of FIG. 3. In the system of the electric device, this indicates that the magnetic flux from the two stators at the position of the rotor is less than the maximum amplitude. As a result, the total generated EMF decreases as a function of the degree of misalignment of the stators, resulting in differing values of the superposition of the two out-of-phase waveforms. For example, FIG. 7 illustrates that to reduce the generated EMF to ½ of the initial value, the stators should be misaligned by ⅔ of a pole pitch phase difference. Thus the combined synchronous generated EMF is reduced in amplitude down to zero as the rotatable stator is misaligned relative to the reference stator, with zero amplitude occurring when the rotatable stator has been misaligned by one full pole pitch (see FIG. 9).

Figure 10:
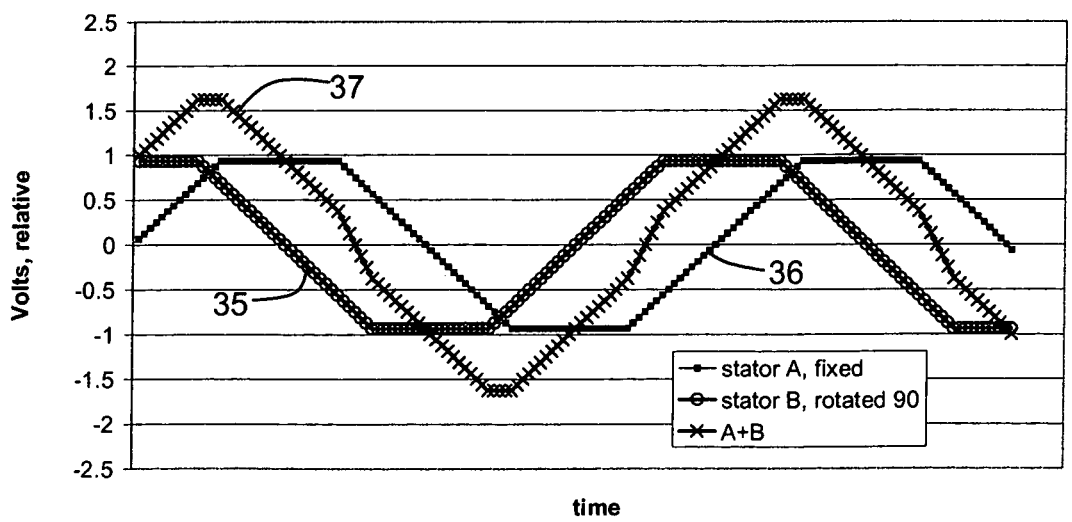
FIG. 10 illustrates the result of the superposition of two types of trapezoidal waveforms from two stators connected in series and misaligned by ½ full pole pitch.

The waveforms in FIGS. 3 through 9 are illustrated as pure sine functions. The superposition of various periodic waveforms, such as square, trapezoidal, triangular waves, etc., can be modeled as sinusoidal waveforms. Such waveforms are produced, e.g., by power electronics controllers of the types frequently used in variable speed drive applications. While pure sine waves are preferred, nearly pure sine waves also yield good results. FIG. 10 illustrates the result of a superposition of two types of trapezoidal waveforms 35, 36 from two stators connected in series and misaligned by ½ full pole pitch. Although, as illustrated, the invention can be practiced with the two trapezoidal waveforms, the resulting triangular waveform 37 is distorted from the original trapezoidal waveforms. Practicing the invention with near-sine waves would produce amplitude changes to the output with less distortion in the waveform shape. Use of near-sinusoidal waveforms ordinarily allows simpler power electronics to be used in conjunction with preferred embodiments of the present machine.

As a result of the misalignment, the one or more rotated stators can be termed "out of phase" with the reference stator. In the description above, the amount of rotational misalignment is defined as a function of pole pitch. The degree of the rotation of stator B can be directly related to a reduction in the generated EMF. However, the reduction is sinusoidally related to the rotation, rather than being linearly proportional. Even so, a direct relationship between pole pitch and reduction in generated EMF can be established in embodiments involving a series connection.

Ideally, the misalignment is achieved with as little rotational movement as possible, while still obtaining the desired reduction in generated EMF. By minimizing the required rotational movement, the design and components (e.g., bearings, mating surfaces, rotation devices, and the like) used to manage the rotation may be simplified.

As discussed hereinabove, low pole count machines with high pole pitch values found in the conventional art are generally not preferred for the practice of this invention. With high pole pitch machines, the amount of physical rotation required to achieve enough misalignment even a small reduction in generated EMF is sometimes too great to be mechanically practical. The length of the arc of rotation of misalignment for low pole count machines is larger and less controllable. As a result the prior art has ordinarily sought to reduce the EMF in axial airgap machines by other means, such as by reducing the length of the airgap (e.g., U.S. Pat. Nos. 2,892,144 and 2,824,275) or by reducing the overlap between rotor and stator (U.S. Pat. Nos. 403,017 and 6,555,941).

However, implementation of rotational misalignment is far easier in machines with high pole count, that inherently have a smaller pole pitch. The length of the arc of the rotational misalignment for producing large reductions in generated EMF is therefore much smaller in high pole count, high-frequency machines than in conventional machines. The present methods are advantageously applied to high-frequency, high pole count, low pole pitch, axial airgap electric devices using advanced soft magnetic materials, including the aforementioned amorphous and nanocrystalline metals, and optimized grain-oriented and non-grain-oriented Fe-based metals.

The present invention therefore provides a method for reducing the generated EMF without the necessity of reducing the axial length of the airgap or reducing the overlap between the rotor and stator. However, the present method of rotational misalignment is optionally practiced in conjunction with methods which entail reducing the airgap, or changing the physical overlap between the rotor and stator.

Reduction of Torque Ripple

In some embodiments, the technique of selective alignment of one or more stators relative to one or more reference stators of the present machine can also be practiced to reduce torque ripple.

An electrical machine designer preferably attempts to eliminate torque variations to produce a smooth output with substantially constant torque. Desirably, a machine operates with a torque that does not vary with angular position of the rotor. However, in a given electric device, there are almost inevitably some positions of the rotor at which the magnetic permeability of the magnetic circuit is higher than for other positions. These are natural positions for the rotor to have increased torque, for both zero-current and applied current conditions. In the dynamoelectric machine art, a distinction is often made between torque cogging and torque ripple. The former refers to perturbations or variation of torque with rotational position with no current input/output to the machine, while the latter refers to torque variation during operation, i.e. under power loading. However, ripple and cogging are physically related phenomena, and are sometimes considered as being interchangeable. Torque ripple is affected by both the design of the electric device and power electronics operation. Torque cogging is largely dependent on machine design parameters. As the present invention is mainly concerned with the design of the electric device, however, torque cogging and torque ripple can be considered together.

The magnets in the rotor provide the greatest magnetic flux linkage to the stator when a magnet is directly in-line with a stator tooth. Therefore, in the present machine, by changing the positions of this physical alignment, i.e., by rotationally misaligning a stator relative to a reference stator, the angular positions at which the respective stators exhibit their highest instantaneous flux linkages do not coincide. For example, the stators may be misaligned such that one stator experiences the highest magnetic flux linkage at the position at which the other stator exhibits its minimum flux linkage. Suitably chosen selective alignment therefore substantially reduces the amplitude of torque ripple, albeit increasing the frequency of the ripple.

Independent of speed, torque ripple varies between its maximum value (100%) at 0% slot pitch misalignment, and its lowest value at 50% slot pitch movement. Thus, the degree of misalignment or offset amount for reducing torque ripple can be expressed in terms of slot pitch. The optimal rotational degree of misalignment for minimization of torque ripple is to have the rotatable stator offset by exactly ½ slot pitch relative to the reference stator.

Figure 11:
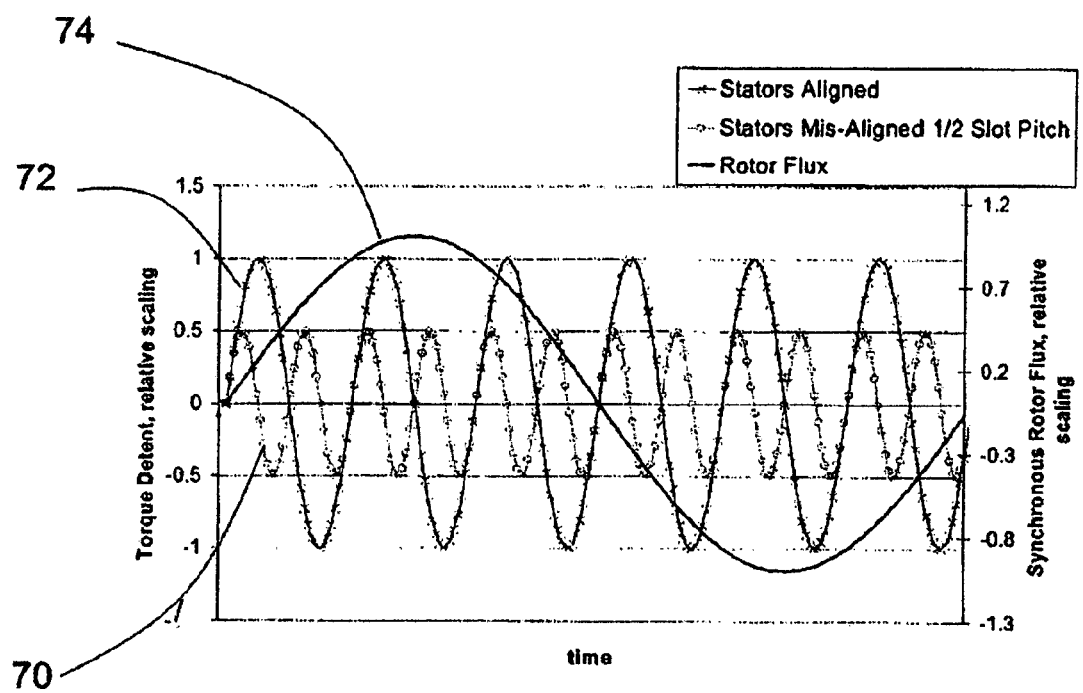
FIGS. 11 and 12 illustrate torque perturbation, at zero electrical current, for stators misaligned by ½ slot pitch.
Figure 12:
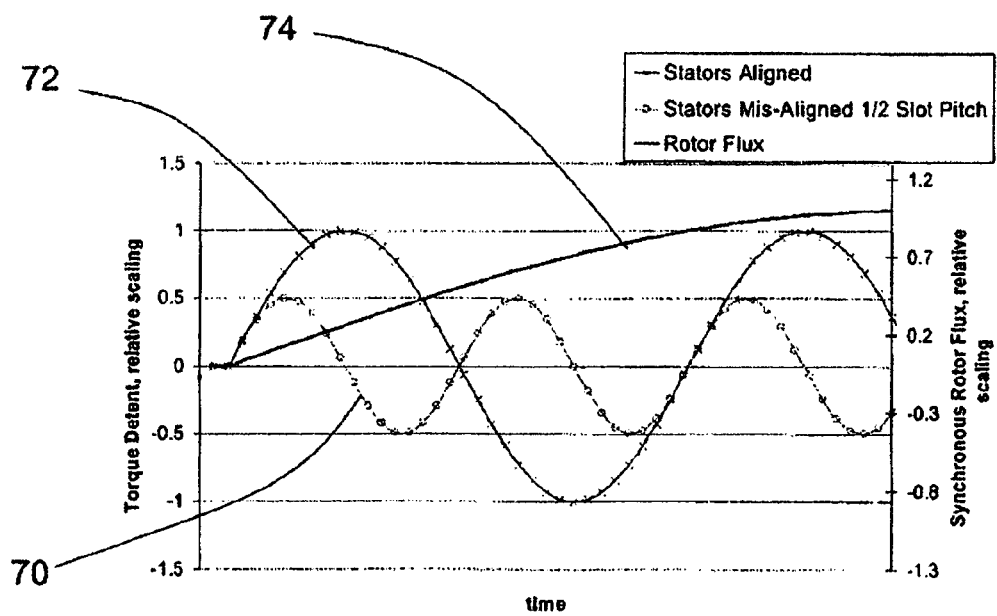

FIGS. 11 and 12 illustrate the torque perturbations, at zero electrical current, for stators misaligned by ½ slot pitch (sinusoidal waveform 70), normalized relative to the perturbations produced when the stators are aligned (sinusoidal waveform 72). The magnetic flux from the rotor magnets is represented by sinusoidal waveform 74.

While the illustration depicted in FIGS. 11–12 is for an electric device with an SPP value of 0.5, the method applies equally well to machines with other SPP values. With the rotatable stator misaligned relative to the reference stator by the amount of ½ slot pitch, the torque ripple amplitude is generally reduced by ½, while the torque ripple frequency is increased by a factor of 2. The natural frequency of the torque ripple varies for different SPP values. For example, the torque ripple for an electric device with an SPP value of 0.5 has a characteristic natural frequency that is 6 times the commutating frequency of the electric device.

As previously described, the misalignment of the two stators relative to each other also causes the generated EMF to be reduced. The amount of reduction of generated EMF for an SPP value of 0.5 is about 3.5%, if the stators are misaligned by ½ slot pitch. A rotation of greater than ½ slot pitch rotation for the non-reference stator in fact causes the torque ripple to again increase, as the slots become more in-line and cause increasing magnetic flux linkage. In the case of ½ slot pitch rotation, the designer accepts a 3.5% reduction in power, for a 50% reduction in torque ripple. The torque ripple behavior for other SPP ratios can similarly be determined.

Elimination of Torque Ripples in Multiple Rotor Machines

In another aspect of the present invention, the technique of selective alignment can also be applied to reduce, or preferably substantially eliminate, torque ripple and cogging. In embodiments for electric devices comprising two or more rotors, the optimal rotational misalignment of the rotors as well as the stators relative to a reference rotor can result in the substantial elimination of torque ripple.

While an embodiment of an electric device comprising one rotor is used for illustration, the techniques of the invention can be practiced in embodiments comprising more than one rotor. For a design comprising two rotors, with the rotors on a common shaft, each rotor can be driven by one or more respective stators. There is also some flexibility in configuring the stators. For example, in a 2-rotor, 4-stator electric device, the stators that are physically closest to each other could by conjoined into one common stator, giving rise to an effective and efficient 2-rotor, 3-stator machine.

In such an embodiment, the two rotors are mounted on a common shaft. In a conventional design, the two rotors are mounted such that the magnetic poles are aligned circumferentially. However, for practicing the technique of selective alignment of the present invention for the elimination of torque ripple, the two rotors are misaligned such that one rotor is rotated by ½ slot pitch relative to the other rotor, while their respective stators are also misaligned to match the rotors. As a result, the torque perturbations are 180 degrees out of phase, and effectively cancel each other.

The technique of selective alignment of the rotors as well as the stators may not eliminate the contributions of the higher order harmonic variations to torque ripple. In fact, some of these higher harmonics may be constructively enhanced with the misalignment. However, these higher order terms are generally of much smaller magnitude then the first order terms, and therefore can be ignored in most applications of electric devices. There is also the likelihood that the torque ripple waveforms are not perfect sine waves, and this also results in the superposition containing some distortion.

Use of Dual Full Wave Rectifiers to Reduce Electrical Ripple

Figure 24:
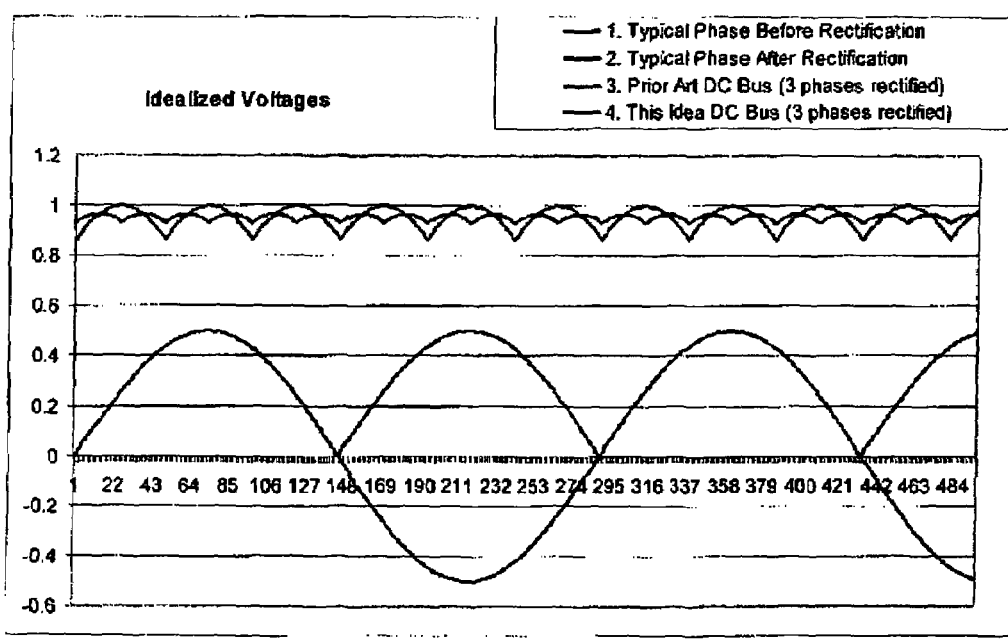
FIG. 24 shows a comparison of a typical single phase AC voltage generated from an electric machine, including the rectified voltage, and the rectified three phase voltage, including ripple.

Ripple is further used in the dynamoelectric machine art to refer to certain AC aspects of the electrical characteristics of a machine. Rectifier means, such as full wave rectifiers, are used in many prior art electric generating devices, and particularly alternators, to take the multi-phase AC output from the windings and convert it to relatively smooth DC output. For three-phase applications, this rectification is done via an arrangement of six diodes conventionally known as a "full wave bridge" or a "diode bridge". Other diode bridge arrangements are also known for single phase and polyphase systems with other than three phase connections. The input to the bridge is the sinusoidal voltage/current generated in the windings; the output is a DC level, known as a DC bus. FIG. 24 shows a single graph showing a single phase, sinusoidal AC output of amplitude 0.5 (arbitrary units), along with the corresponding full-wave rectified single phase AC output and the combined three phase output on the DC bus. Although the voltage on the DC bus is often spoken of as being a constant (i.e., Vdc=Vrmsline*(~1.35)), in reality the DC bus waveform is a superposition of an average but strictly constant DC level and a smaller AC component. A typical variation of the nominally DC bus voltage in a full wave diode bride configuration is shown in FIG. 24. The AC component, i.e., the variation from the average DC level on the bus, is known as electrical ripple. Electrical ripple is generally expressed as a percentage (error) from the average DC level. For an ideal 3-phase full wave bridge, this ripple occurs at a frequency that is six times the frequency of any of the original sinusoidal phase voltages.

Electrical ripple is undesirable for many reasons. These reasons are well known, including poor battery charging characteristics in automotive applications, increased harmonic losses in all devices, difficulty in converting the DC level to error-free sine wave voltages, etc. Therefore it is desirable to reduce and preferably eliminate electrical ripple on the DC bus.

Figure 25:
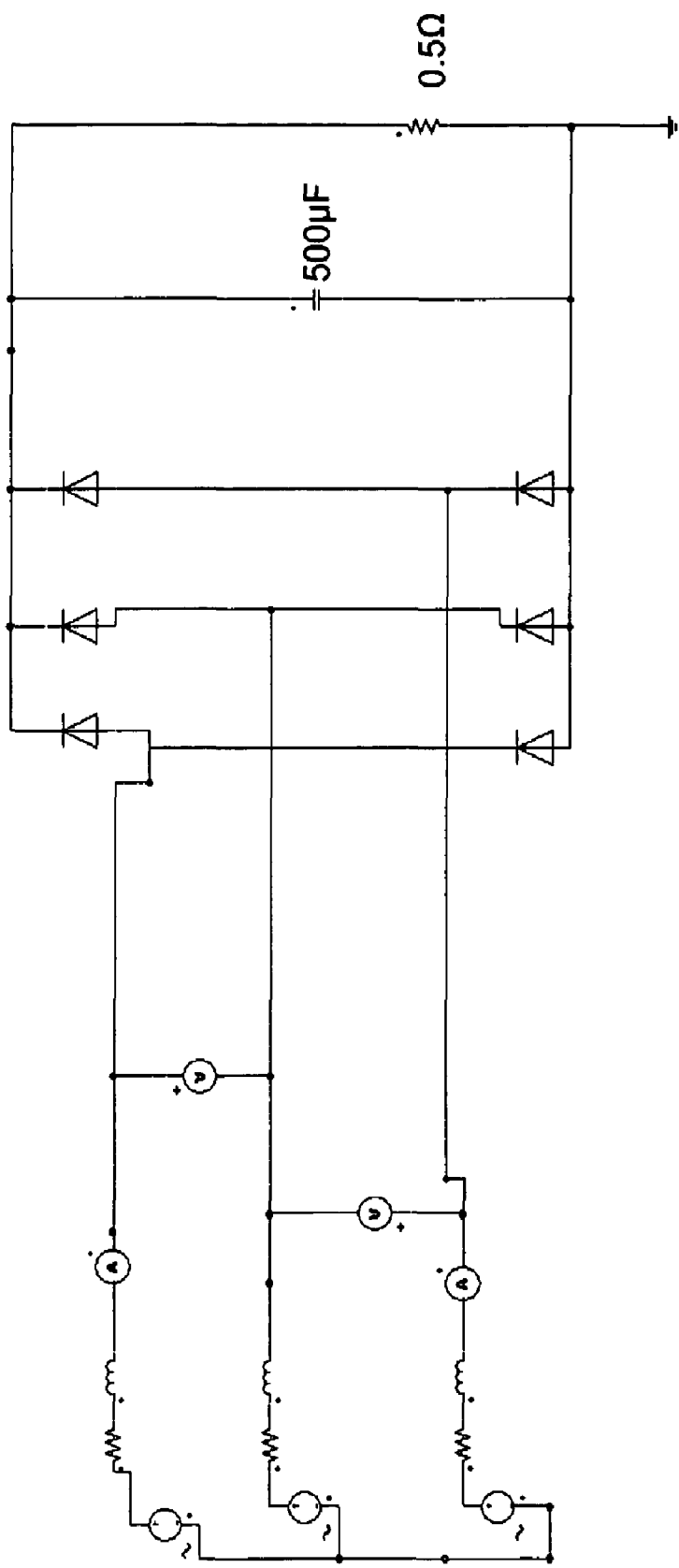
FIG. 25 shows a typical prior art full wave diode bridge used connection in an electric machine.
Figure 26:
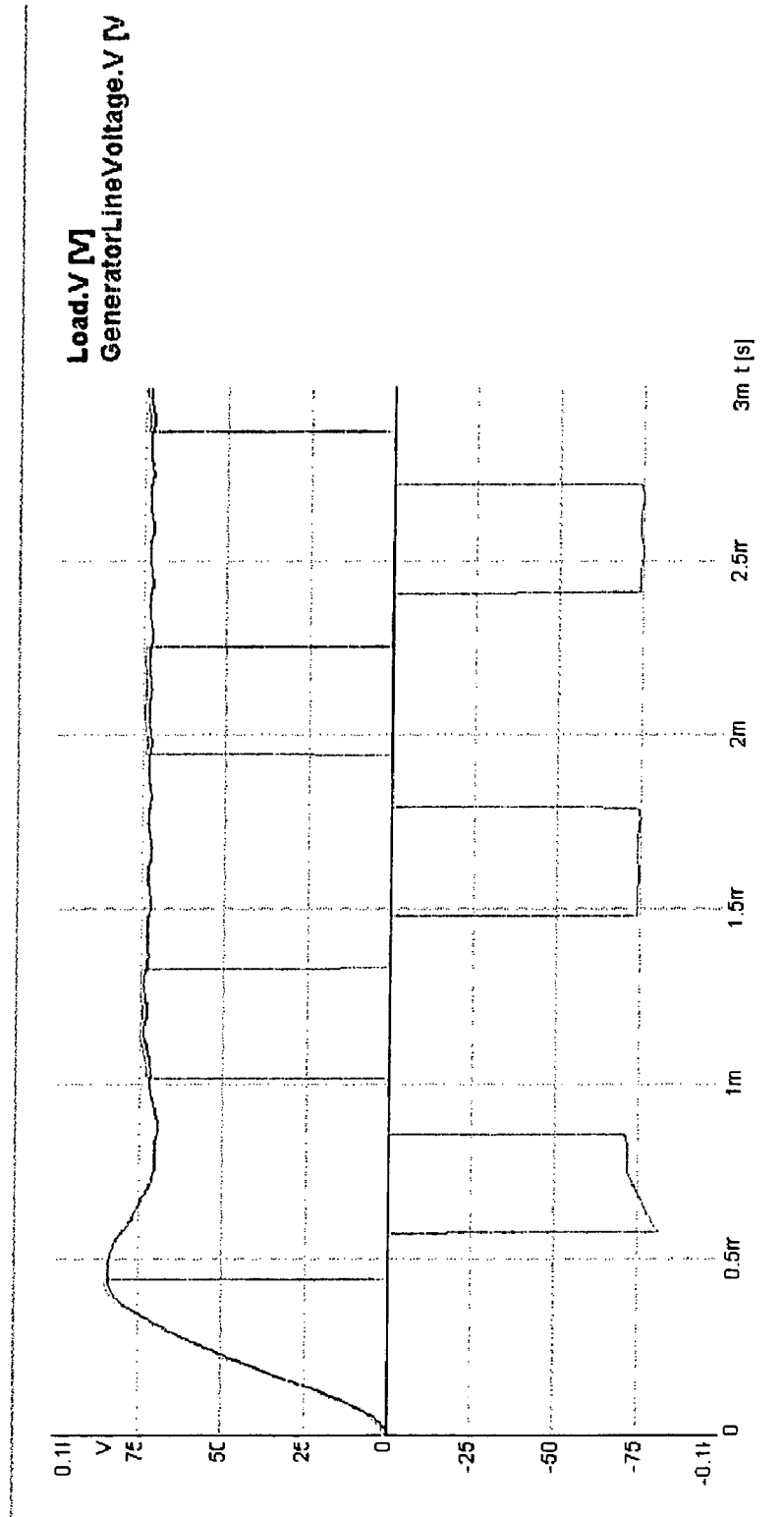
FIG. 26 shows a typical prior art rectified three phase voltage from the arrangement of FIG. 25.
Figure 27:
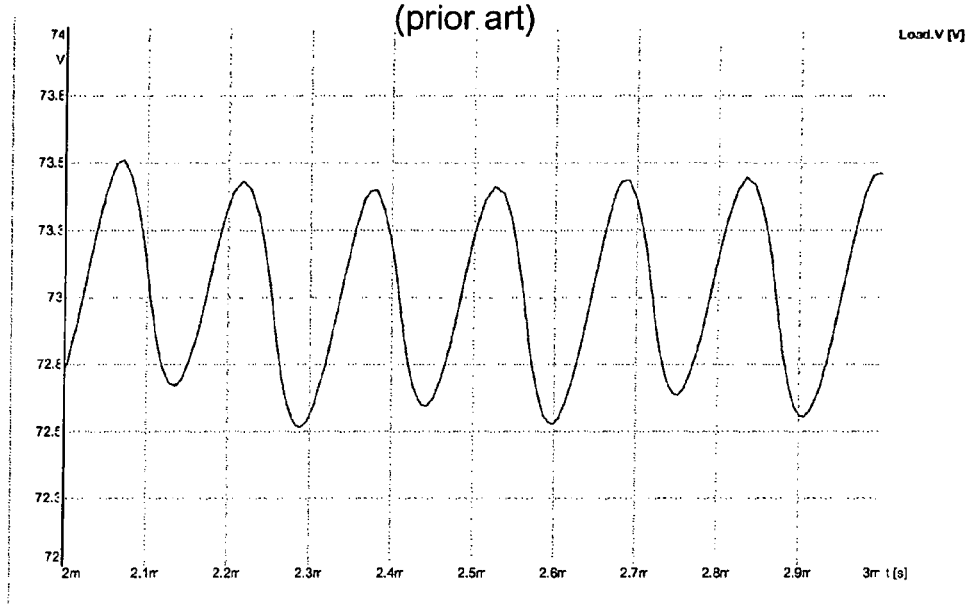
FIG. 27 shows a detail of typical DC voltage ripple associated with the waveform of FIG. 26.
Figure 28:
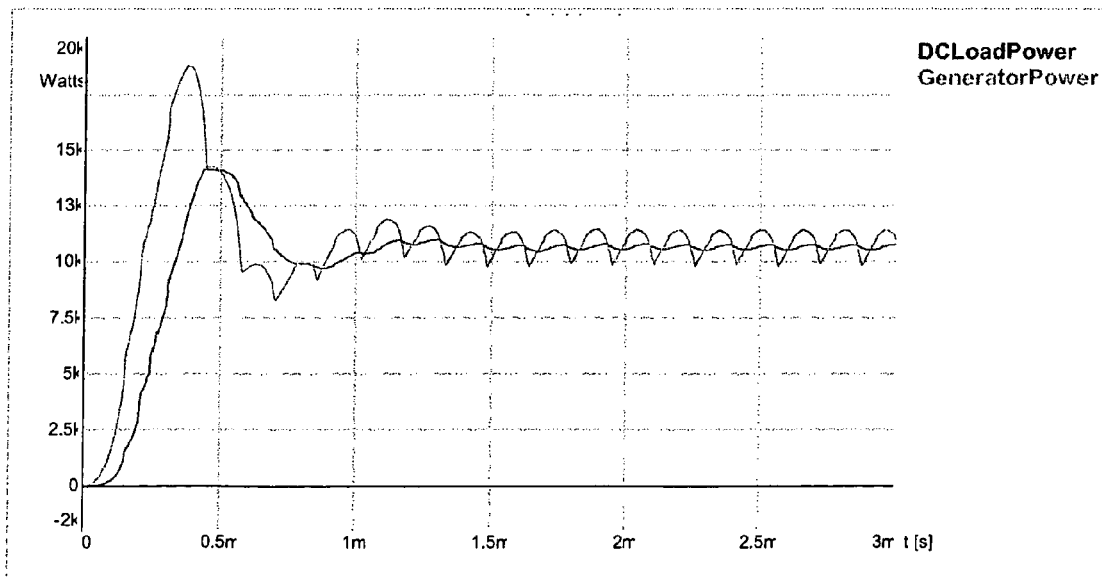
FIG. 28 shows the mean DC power typical in association with an electric machine arrangement such as that shown in FIG. 25.

The conventional approach to reducing ripple on the DC bus has been to provide one or more capacitors connected in parallel to the DC load. These capacitors act to reduce the amount of ripple to an acceptable level. However, capacitors are costly and bulky in size, especially larger capacitors. Therefore, capacitors add cost to the electric machine and are difficult to position in the machine, especially as size becomes a consideration. In some cases, the capacitors also present a reliability issue. FIG. 25 shows schematically such a capacitor connected across the DC load in a typical prior art electric machine. This addition of capacitance is known as filtering, in that the unwanted ripple is removed, i.e. filtered out of the pure DC level. FIG. 26 shows a typical prior art rectified three phase voltage produced by the arrangement of FIG. 25. A small amount of ripple can be seen on the DC bus. FIG. 27 shows this ripple in greater detail. FIG. 28 shows the mean DC power with superposed ripple typical in association with an electric machine arrangement such as that shown in FIG. 25.

Figure 29:
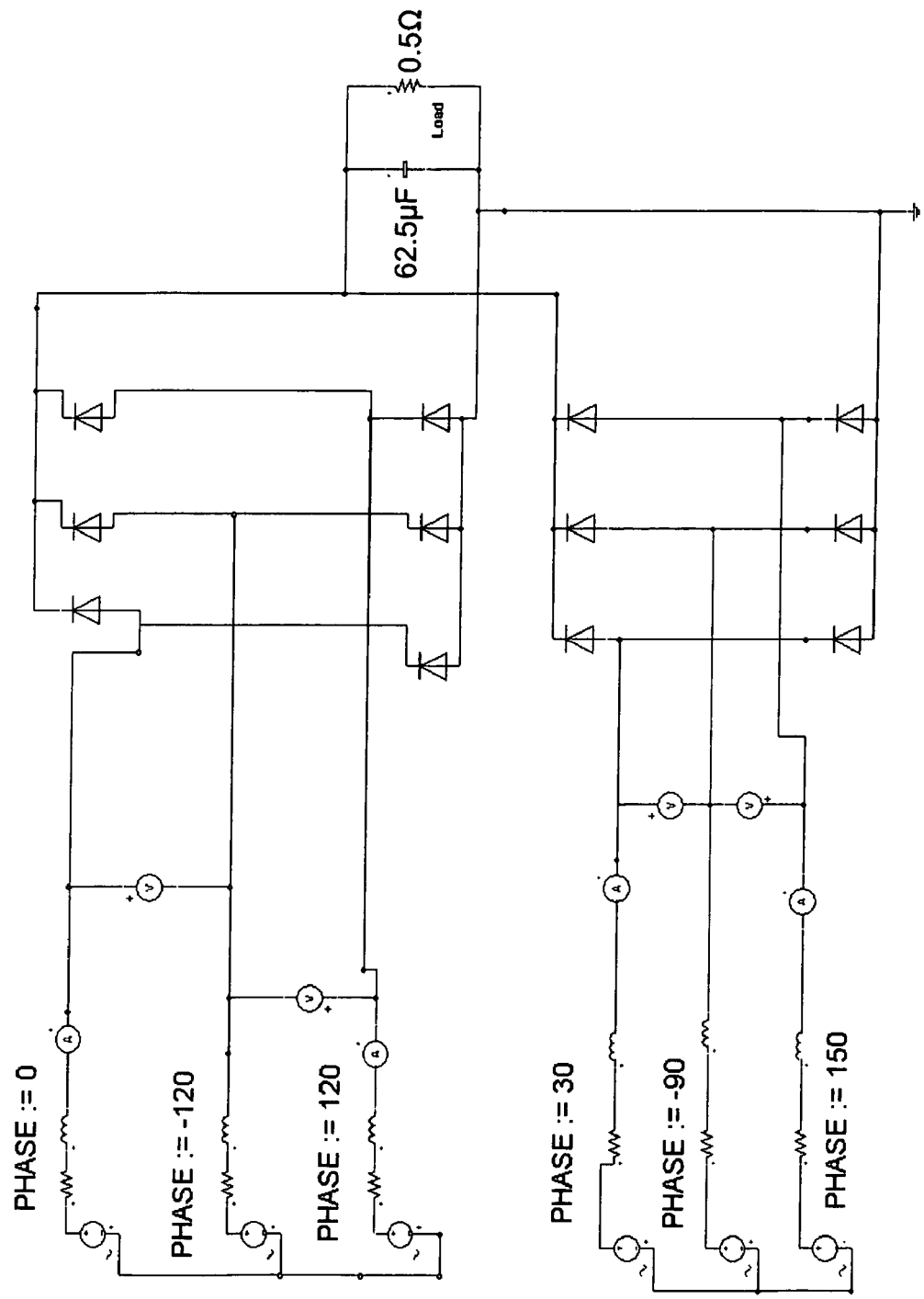
FIG. 29 shows dual full wave diode bridges used in association with dual stators of an electric machine.
Figure 32:
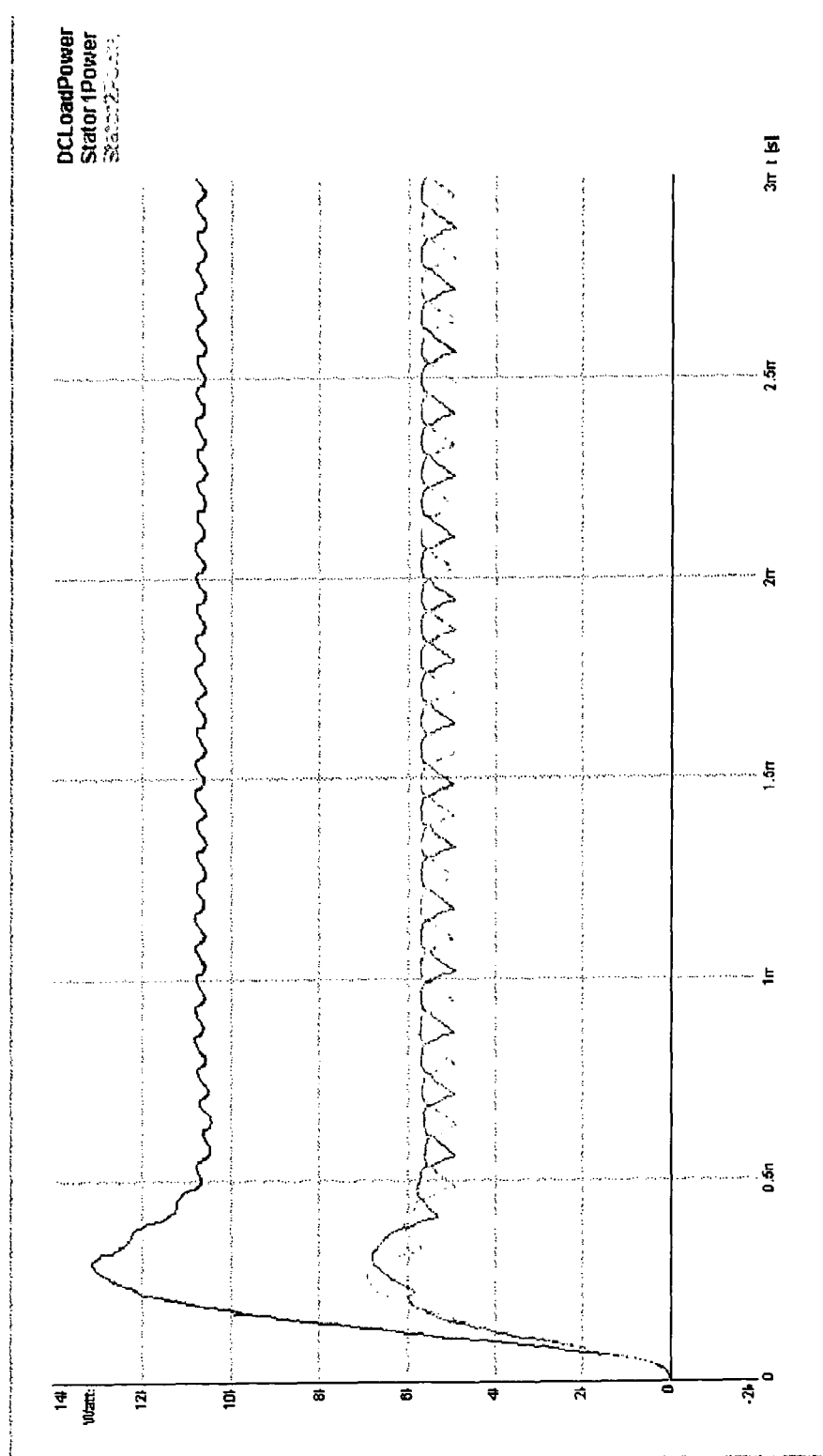
FIG. 32 shows the mean DC power associated with the electric machine arrangement of FIG. 29.

With reference now to FIG. 29, an electric machine is shown with dual full wave diode bridges of the three-phase type and dual stators with three-phase windings. One of the bridges is associated with each respective stator and is connected to that stator's windings. By way of contrast, in typical prior art arrangements the stator outputs were combined before being connected to a single full wave bridge. The dual full wave diode bridge arrangement shown in FIG. 29 is particularly useful with dual stators that are selectively aligned (or "misaligned") such that the stators are rotationally offset with respect to each other as described above. In one embodiment, one stator is physically rotated with respect to the other into a selected alignment that is 30° electrically offset. The outputs from these dual diode bridge rectifiers are connected in parallel. The ripple created on the joint DC bus has peaks from one bridge that are offset by the valleys from the other bridge, as a result of the aforementioned 30° offset. Due to the imperfect sine wave nature of the ripple, the reduction of ripple will not be to zero. However, the new, combined ripple has a waveform with nominally ¼ the amplitude and at twice the frequency. That is to say, the peak-to-peak interval in the combined signal is ½ the peak-to-peak interval of the constituent waveforms. For an ideal case, the new DC ripple will be approximately ¼ of the amplitude of the prior art ripple, and will now occur at twice the prior art ripple frequency. Furthermore, as shown in FIG. 32, the mean DC power of the electric machine arrangement using dual full wave diode bridges and a smaller capacitor is approximately the same as the prior art arrangement shown with only one full wave diode bridge (i.e., 11 KW for the particular simulation shown). Although a dual full wave diode bridge arrangement, e.g. the arrangement depicted by FIG. 29, adds the cost of an additional diode bridge, it provides substantial savings by way of the reduced cost of the smaller capacitor and less space required for the smaller capacitor. In addition, each diode bridge, and the individual diodes thereof, carry only half the current carried in a conventional single bridge, used with a machine of the same power rating, permitting use of less expensive diodes.

Figure 30:
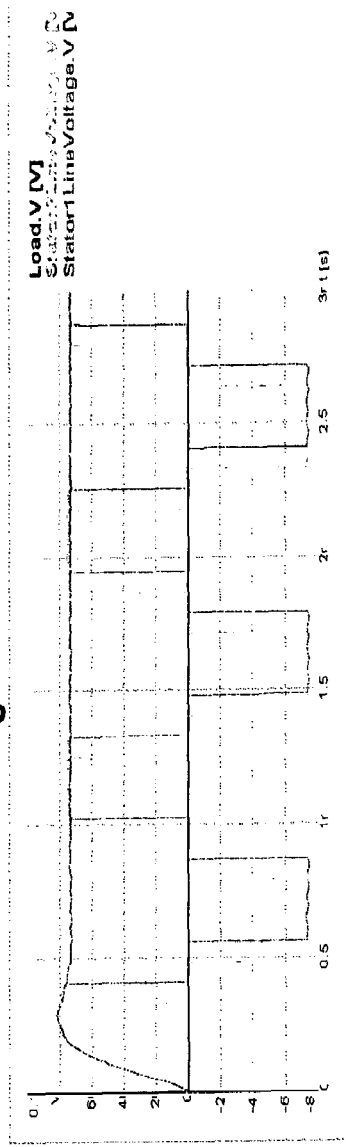
FIG. 30 shows the rectified three phase voltage from the arrangement of FIG. 29.
Figure 31:
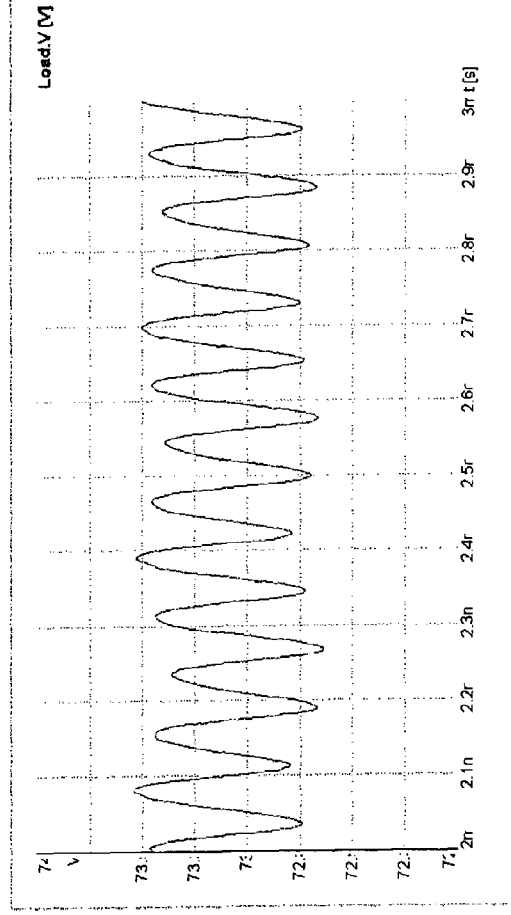
FIG. 31 shows a detail of the DC voltage ripple associated with the waveform of FIG. 30.

As an additional consequence of the increased ripple frequency and decreased ripple amplitude, a much smaller capacitance suffices to reduce the ripple to an acceptable level. As shown in FIG. 29, as little as about ⅛-th the previously required capacitance may be used, yet the ripple on the DC bus is about the same as that of the typical prior art device having a larger capacitor and only one full wave diode bridge arrangement, as shown in FIGS. 30 and 31.

As discussed previously, a physical change in the alignment of distinctly separate stators results in a change in the resulting EMF produced from the electric machine. In fact, it has been discovered that selective alignment of separate stators (i.e., a first stator and a second stator) can reduce unwanted DC ripple. In particular, instead of being directly aligned, the first stator and second stator are selectively aligned so as to be out of direct alignment by 1/12 of the fundamental frequency (i.e., the synchronous frequency). In physical terms this can be said to be 1/12 of a magnet pole-pair angle (i.e., ⅙ the pole pitch). The rationale for this is that for the most common application (i.e., a 3-phase machine working with a full-wave diode bridge), the ripple frequency on the DC bus (i.e., the output of the diode bridge) is 6 times the frequency of the 3-phase machine synchronous frequency. In other words, the time interval between peaks in the ripple frequency is ⅙ of the time interval between peaks of the synchronous frequency. Thus, to cancel as much of this ripple frequency as possible, the selectively aligned stator must be rotated ½ of the ripple time interval, or 1/12 of the synchronous time interval.

An additional advantage to the above-described arrangement of selectively aligned stators with dual full wave rectifiers is that the size and cost of the capacitor used across the DC load is directly related to amplitude of the ripple, and to the inverse of the frequency of the ripple. Thus, this invention has an advantage in the reduction of the size and cost of the capacitor that may be used across the DC load as compared to capacitors in the prior art solutions. Typically, a capacitor of ⅛-th the size of the capacitor that would have been required under the prior art arrangement is all that is required. In some applications, the ripple may even be low enough such that no capacitance whatsoever is necessary.

Mechanisms for the Rotational Misalignment of Stators

The present machine can be implemented with stators that are disposed with either a fixed or an adjustable degree of relative offset. In embodiments with adjustable offset, a misalignment means of any suitable type permits adjustment between a minimum and a maximum offset amount. Preferably, the offset is adjustable between substantially full alignment of the corresponding teeth and slots of each stator and misalignment by up to a half slot pitch or a full pole-pitch. Embodiments with either manual or automatically adaptive adjustment are within the scope of the present invention.

A number of misalignment means are suitable, including those used in three different classes of systems discussed hereinbelow, each having different input parameters. The first system involves active control of EMF through control of the movement of a rotatable stator via an external source. The second system involves control via a speed-dependent mechanism. The third system involves control via a torque-dependent mechanism. Any of the three systems described or other like systems can be practiced singly in a given electric device, or in any combination. While the systems are described in connection with reduction of the generated EMF, one of ordinary skill in the art could employ any of the foregoing systems to reduce or substantially eliminate torque ripple according to the teachings above.

External Control

The technique of controlled, selective alignment of one or more stators relative to one or more reference stators can be achieved by using an external control source for controlling the value of generated EMF. In preferred embodiments, the external control source has a source of power that is independent of the electric device being controlled. Through choice of the appropriate position of the rotatable stator, the desired EMF can be achieved. Many different means for accomplishing the appropriate positioning are available in the art.

In some embodiments, the stator misalignment is adjustable in two or more discrete steps of misalignment, one of which may be substantially full alignment. Other embodiments contemplate a continuously variable misalignment ranging from a minimum to a maximum offset. The misalignment may be actuated by any suitable source of mechanical motion, including pneumatic, hydraulic, piezoelectric, electrical, or magnetic actuators, or the like.

The misalignment means comprises appropriate positioning devices, which may include nonexclusively any one or more of a two position solenoid; a voice coil motor; a piezoelectric actuator; a stepper or other motor with a gear, lead screw, or the like; a vacuum cylinder; an air pressure cylinder; a hydraulic cylinder; and a linear motor. The stepper motor with lead screw is preferred for its reliability, mechanical stability, and ease of implementation and precise control. In addition, an elastically deformable return member, such as a spring, may be provided. Alternatively, some or all of the misalignment may be manually actuated.

Figure 13:
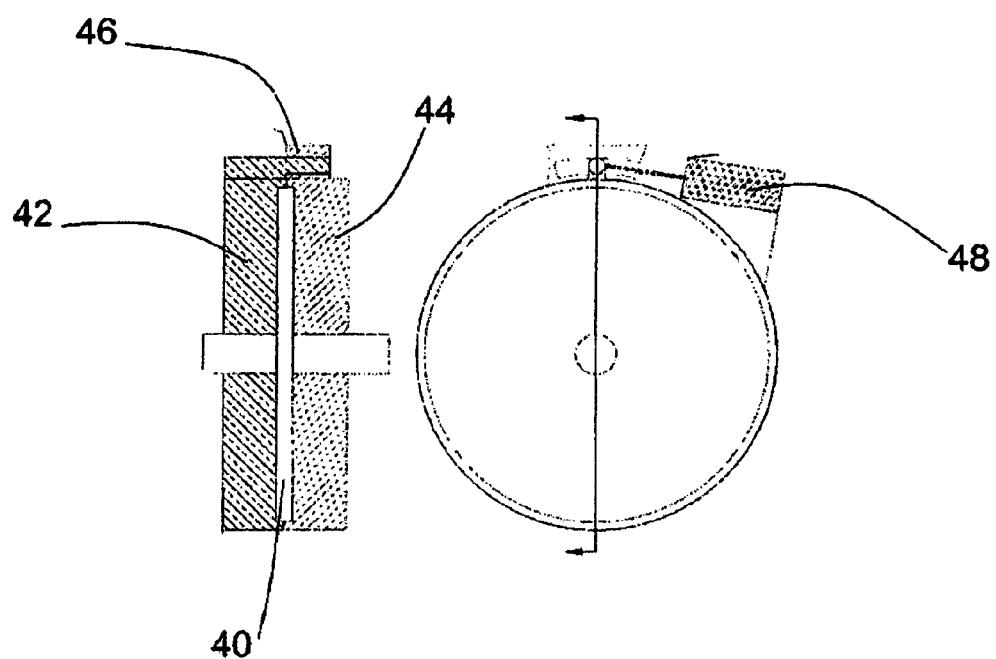
FIG. 13 illustrates a top and a side view of an embodiment of an electric device comprising a single rotor and two stators.
Figure 14:
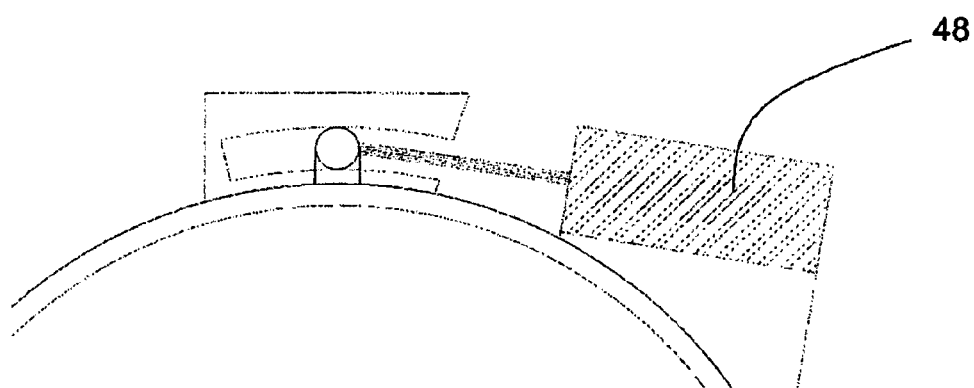
FIGS. 14 and 15 illustrate two different positions of an external control system for controlling the rotational misalignment of one or the stators.
Figure 15:
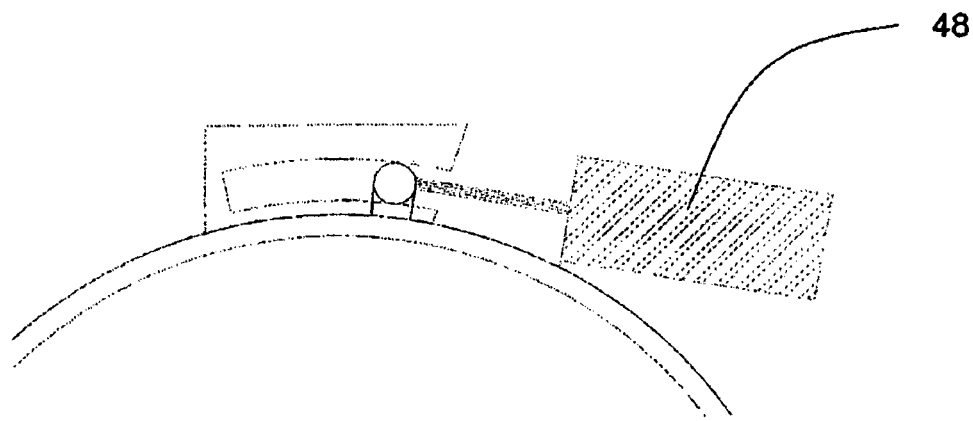

FIG. 13 illustrates a top and a side view of an embodiment of an electric device comprising a single rotor 40 and two stators 42, 44. One stator is taken as a fixed reference stator 44, while the other stator is the rotatable stator 42. A stator alignment control 46 is connected to reference stator 44. An external control system 48 provides the means for rotating rotatable stator 42 from the zero misalignment position to the desired degree of misalignment. FIGS. 14 and 15 illustrate two different positions of the external control system 48 for controlling the misalignment of rotatable stator 42. The position of the external control system 48 would be correlated with the desired degree of misalignment for producing, e.g., the desired reduction in generated EMF.

In an embodiment, a solenoid is attached to the rotating stator. This solenoid positions the rotating stator to achieve the desired generated EMF. A control signal arrives from demand for generated EMF. The solenoid positions the rotatable stator in one of two rotation positions as demanded.

It is also possible, and especially preferred, to position the stator using a motor and lead screw assembly. This provides a larger number of positions than a simpler two position solenoid. It is also possible to position the rotating stator with any combination of electrical, pneumatic, hydraulic, piezoelectric or other mechanical positing devices. In machines incorporating any of the aforementioned means, one or more counter weights (not illustrated) is optionally provided to compensate for any problematic imbalance of the stators caused by the mass of the positioning assemblies.

Speed Dependent Control

An embodiment involving speed-dependent control of the rotational misalignment generally requires no feedback from the machine EMF. Instead, the generated EMF is designed to be in a range that can be controlled by a speed-dependent device. A speed-dependent device is one that causes the rotatable stator to move from a base position (generally approximately zero misalignment) to the designed degree of misalignment as the speed increases. The rate of misalignment rotation of the one or more rotatable stator is prescribed according to the desired rate of reduction of the generated EMF. The misalignment is reversible. That is to say, as the speed decreases, the misalignment of the one or more rotatable stators decreases, returning down to the base position of zero misalignment at a specified minimum speed (which may be zero).

Figure 16:
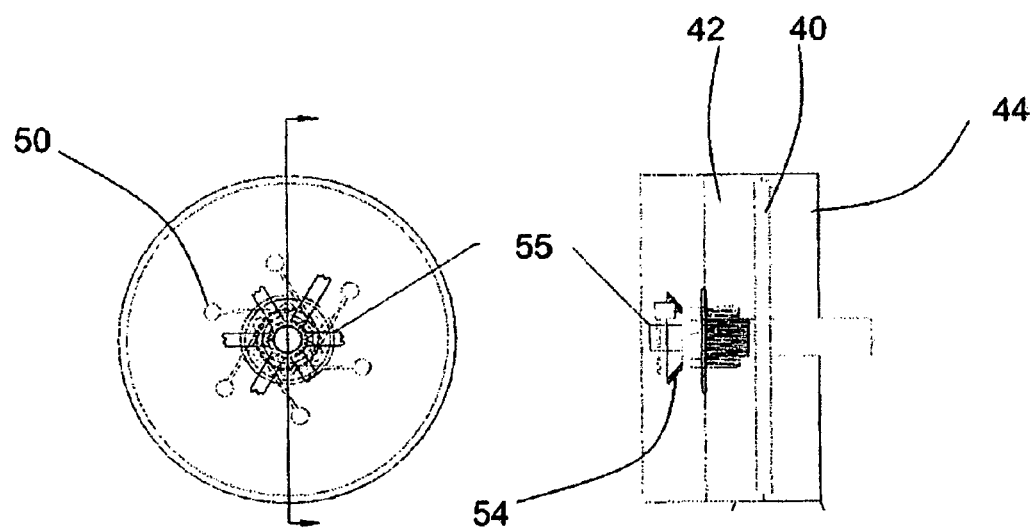
FIGS. 16, 17 and 18 illustrate the operation of a mechanical governor-style speed-dependent control for rotational misalignment of a stator.
Figure 17:
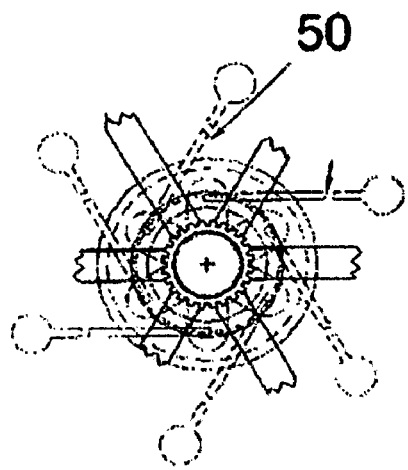
Figure 17:
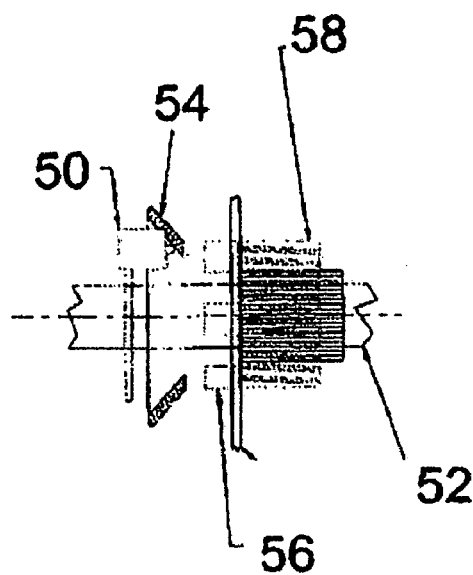
Figure 18:
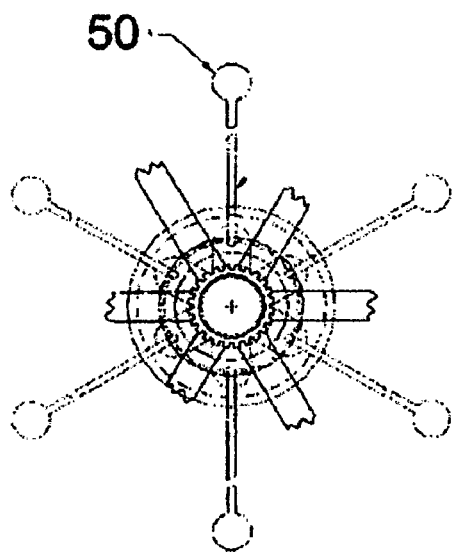
Figure 18:
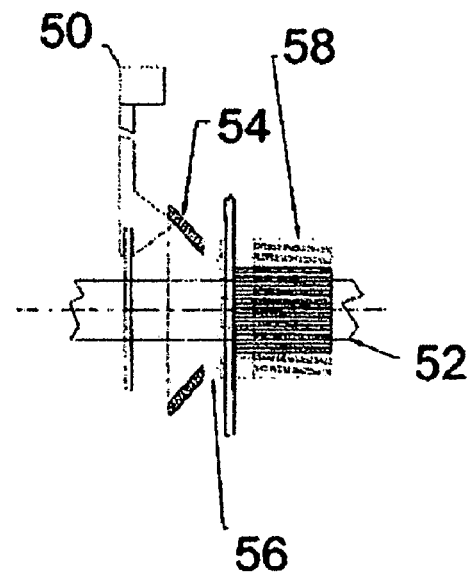

One embodiment of a machine incorporating a speed-dependent control is depicted by FIGS. 16 through 18, which illustrate the operation of a mechanical governor-style speed-dependent control for rotational misalignment in an embodiment of an electric device comprising a single rotor 40 and two stators 42, 44. The centrifugal assembly 55 comprises weights 50, which are connected to a flange that is mounted to the rotating shaft 52. The weights 50 are allowed to swing to a larger working radial distance (from the center of rotation) as speed increases. The centrifugal assembly also comprises a spring system to return the weights 50 to the retracted working radial distance at very low speeds. In the illustration of FIGS. 16 though 18, the weights 50 also have rounded triangular cams that interact with a cup 54.

As the speed increases during operation, the centrifugal forces increasingly supply force to overcome the spring force acting on the weights 50, and causes them to swing to ever-increasing radial distance (FIG. 18). As a result, the rounded triangular cams cause the cup 54 to move to the right in the illustration, i.e., be depressed towards the fixed stator 44. The cup 54 bears upon a thrust bearing 56, which is attached to a low-pitch screw 58, which is connected to the rotatable stator 42. The depression of the cup ultimately results in the rotational misalignment of the rotatable stator 42 relative to the fixed stator 44. The low-pitch screw 58 moves upon straight splines on its inside diameter. The low-pitch screw 58 is constrained from turning, in that it is held by the axially parallel inner splines. As the low-pitch screw 58 is moved axially, it in turn rotates the rotatable stator 42 to the desired angular position. These straight splines are ultimately attached to the reference stator 44 by means of support spokes. At low speeds, and thus lower centrifugal force, the weights are retracted by the spring force to their smallest working radial distance, as illustrated in FIGS. 16 and 17. As a result, the cup 54 and low-pitch screw 58 move to the left in the drawing.

Since the low-pitch screw 58 is constrained from turning itself, it forces the rotatable stator 42 to rotate. To accomplish this, the rotatable stator 42 needs a bearing system capable of a small degree of rotation. The exact design of the rotation system, including selection of such features as screw pitch, screw length, weight mass, weight length, cam and cup design, etc., for a given machine system, is optimized to provide the desired change in EMF. All of these parameters can be selected or optimized as a function of the degree of pole pitch rotation.

Torque Dependent Control

Embodiments involving torque dependent control of rotational misalignment can provide either torque-only or speed-torque control.

An embodiment involving torque-only control of the generated EMF is based on the principle that at a constant speed, as current increases, the power increases. Since power=speed×torque, as the power increases for a constant speed then the torque must also increase. If the rotatable stator is mounted on variable points, then it can rotate in the direction of the torque from the rotor. This rotation changes the generated EMF, and thus the demand for current. In this embodiment of the invention, the amount of rotational deflection is a function of the current demand.

An embodiment involving speed-torque dependent control is such that, as the power output of the electric device is increased, the speed of the rotor shaft is increased as well. The rate of speed increase should not be as great as the rate of power increase. Since power=speed×torque, the torque on the machine must increase as well. The increasing torque that is used to position the rotating stator, and hence control the generated EMF.

Regardless of whether the electric device is allowed to change speed, the rotatable stator 42 can be connected to the reference stator by one or more variable points. At the variable points in the stator alignment control 46 shown in FIGS. 19 through 22, there is a resilient material or device mounted between the variable point and the rotatable stator 42. In FIGS. 19 through 22 only one variable point and only one stator alignment control 46 is shown for ease of demonstration. However, in different embodiments there can be more than one stator alignment control 46 or variable point.

Figure 19:
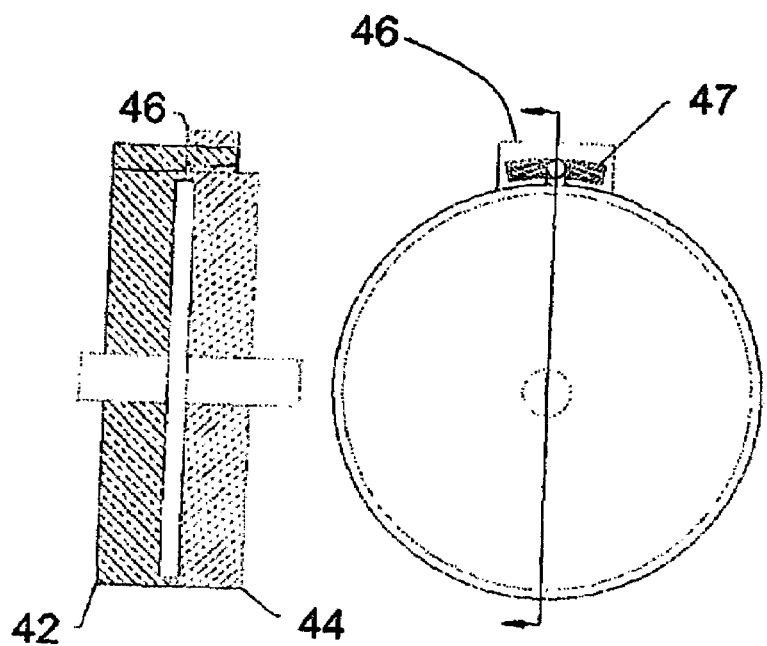
FIGS. 19 and 20 illustrate a stator is mounted on springs for control of rotational misalignment.
Figure 20:
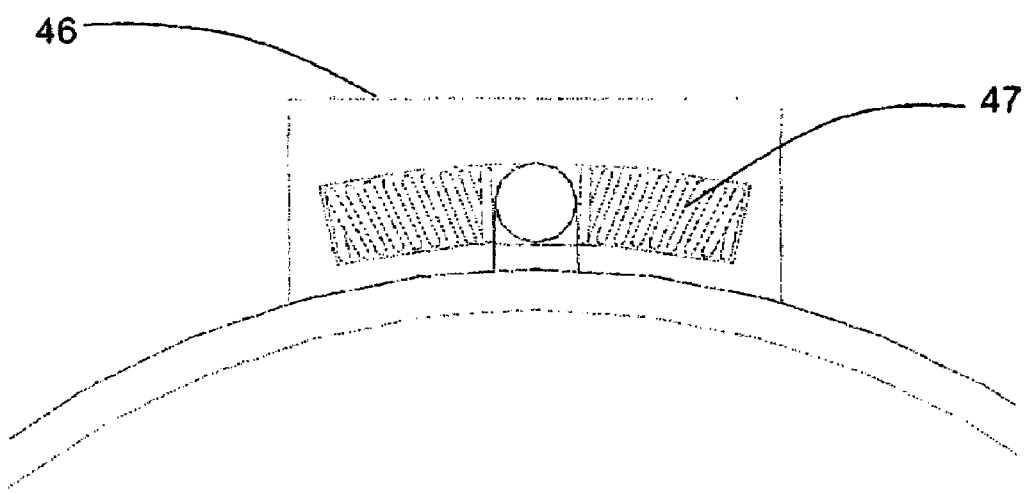

In the embodiment of FIGS. 19 and 20, the rotatable stator 42 is mounted on one or more elastically deformable member, such as springs 47. The springs 47 allow the rotatable stator 42 to move through a limited angle of rotation with the changing torque. The springs would be preferentially compression springs. However, other options that are readily applicable include tension springs, coil, leaf, etc. A variation on springs 47 could be rubber or other organic mounting.

Figure 21:
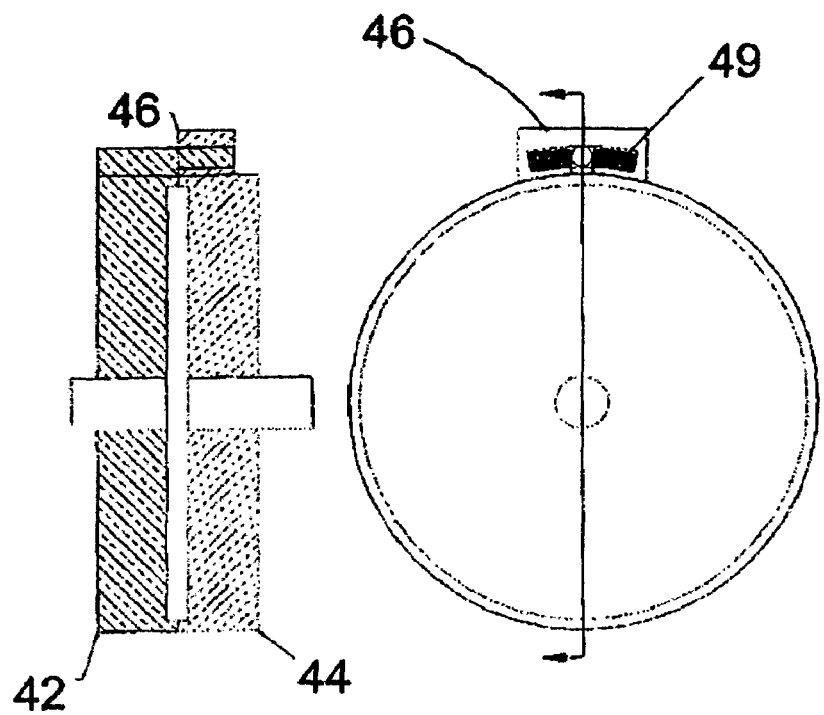
FIGS. 21 and 22 illustrate a stator mounted on a conformal material for control of rotational misalignment.
Figure 22:
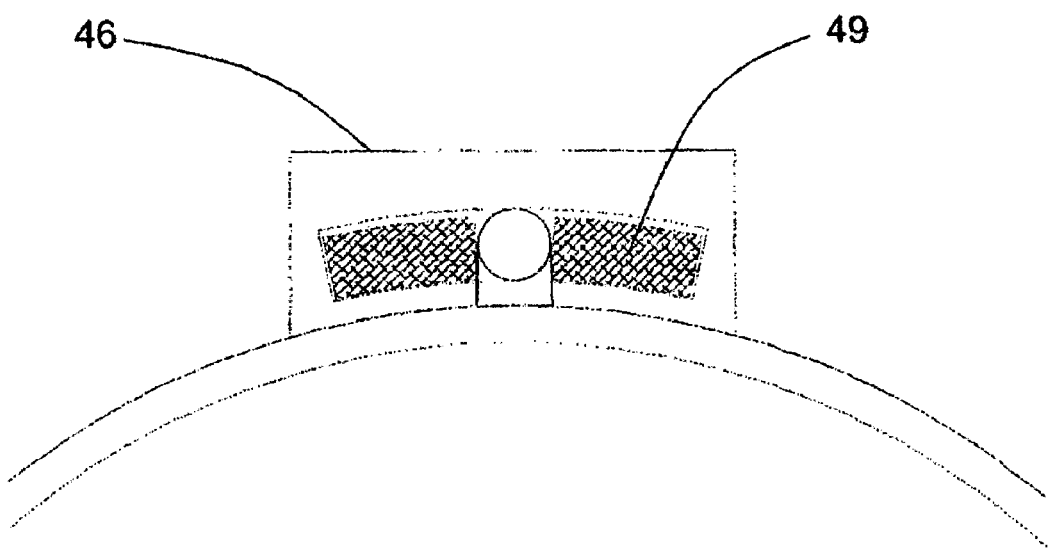

In the embodiment of FIGS. 21 and 22, the rotatable stator 42 is mounted on a conformal material 49. The conformal material 49 would preferentially be some form of urethane. However other options for the conformal material include, but are not limited to, rubber, latex, silicone, oil filled shocks, air pressure, or the like.

Machine System and Power Electronics Control

In yet another aspect, there is provided a dynamoelectric machine system comprising an axial airgap electric machine and power electronics means for interfacing and controlling the machine. The system may function as a motor or generator or a combination thereof. Motoring machines must be supplied with AC power, either directly or by commutation of DC power. Although mechanical commutation with brush-type machines has long been used, the availability of high-power semiconductor devices has enabled the design of brushless, electronic commutation means that are used with many modem permanent magnet motors. In generating mode, a machine (unless mechanically commutated) inherently produces AC. A large proportion of machines are said to operate synchronously, by which is meant that the AC input or output power has a frequency commensurate with the rotational frequency and the number of poles. Synchronous motors directly connected to a power grid, e.g. the 50 or 60 Hz grid commonly used by electric utilities or the 400 Hz grid often used in shipboard and aerospace systems, therefore operate at particular speeds, with variations obtainable only by changing pole count. For synchronous generation, the rotational frequency of the prime mover must be controlled to provide a stable frequency. In some cases, the prime mover inherently produces a rotational frequency that is too high or low to be accommodated by motors that have pole counts within practical limits for known machine designs. In such cases, the rotating machine cannot be connected directly to a mechanical shaft, so a gearbox often must be employed, despite the attendant added complexity and loss in efficiency. For example, wind turbines rotate so slowly that an excessively large pole count would be required in a conventional motor. On the other hand, to obtain proper operation with desired mechanical efficiency, typical gas turbine engines rotate so rapidly that even with a low pole count, the generated frequency is unacceptably high. The alternative for both motoring and generating applications is active power conversion. Embodiments of the present electric machine including misalignment means for back EMF control are beneficially employed with active power conversion, especially in applications involving a wide speed range and/or disparate power requirements.

As used herein, the term "power electronics" is understood to mean electronic circuitry adapted to convert electric power supplied as direct current (DC) or as alternating current (AC) of a particular frequency and waveform to electric power output as DC or AC, the output and input differing in at least one of voltage, frequency, and waveform. The conversion is accomplished by a power electronics conversion circuitry. For other than a simple voltage transformation of AC power using an ordinary transformer that preserves frequency, and simple bridge rectification of AC to provide DC, modern power conversion ordinarily employs non-linear semiconductor devices and other associated components that provide active control.

As discussed hereinabove in greater detail, machines constructed in accordance with the present invention are operable as motors or generators over a much wider range of rotational speed than conventional devices. In many cases, the gearboxes heretofore required in both motor and generator applications can be eliminated. However, the resulting benefits also require the use of power electronics operable over a wider electronic frequency range than employed with conventional machines.

For motoring applications of the dynamoelectric machine system, the machine is interfaced to an electrical source, such as the electrical power grid, electrochemical batteries, fuel cells, solar cells, or any other suitable source of electrical energy. A mechanical load of any requisite type may be connected to the machine shaft. In generating mode, the machine shaft is mechanically connected to a prime mover and the system is connected to an electrical load, which may include any form of electrical appliance or electrical energy storage. The machine system may also be employed as regenerative motor system, for example as a system connected to the drive wheels of a vehicle, alternately providing mechanical propulsion to the vehicle and converting the vehicle's kinetic energy back to electrical energy stored in a battery to effect braking.

Power electronics means useful in the present axial airgap machine system ordinarily must include active control with sufficient dynamic range to accommodate expected variations in mechanical and electrical loading, while maintaining satisfactory electromechanical operation, regulation, and control. Any form of power conversion topology may be used, including switching regulators employing boost, buck, and flyback converters and pulsewidth modulation. Preferably both voltage and current are independently phase-controllable, and control of the power electronics may operate either with or without direct shaft position sensing. In addition, it is preferred that four-quadrant control be provided, allowing the machine to operate for either clockwise or counterclockwise rotation and in either motoring or generating mode. Both current-loop and velocity-loop control circuitry is preferably included, whereby both torque-mode and speed-mode control are can be employed. For stable operation, power electronics means must preferably have a control-loop frequency range at least about 10 times as large as the intended commutating frequency. For the present system, operation of the rotating machine at up to about 2 kHz commutating frequency thus requires a control-loop frequency range of at least about 20 kHz. Controllers used in motoring operations typically employ IGBT semiconductor switching elements. These devices exhibit an increase in switching losses with frequency, so that it is ordinarily preferred to operate with commutating frequencies of up to about 1000 Hz. Motor systems are thus advantageously designed with commutating frequency ranging from about 600 to 1000 Hz, allowing use of less expensive IGBTs while retaining the benefits (e.g. increase power density) resulting from the higher operating frequencies made possible by low-loss materials. For generating applications, suitable rectifier bridges permit operation at even higher commutating frequencies.

In some preferred embodiments, the machine comprises misalignment means actuated by an externally imposed electrical signal and the power electronics means further comprises circuitry to provide a suitable signal to actuate the misalignment means. Beneficially, the use of misalignment means to control back EMF permits the complexity and electrical ratings of the power electronics means to be reduced, thereby simplifying manufacture and reducing costs of the power electronics means. In particular, misalignment can be introduced selectively during periods of high speed operation to limit voltages that must be handled by the power electronics means. Preferably, the misalignment is controlled using a signal transmitted from the power means to the misalignment means. It is also preferred that the adjustment of the offset amount be adaptive. That is to say, the amount is adjusted commensurately with the machine speed. For example, the increase may be in proportion to the speed.

The following examples are provided to more completely describe the present invention. The specific techniques, conditions, materials, proportions and reported data set forth to illustrate the principles and practice of the invention are exemplary and should not be construed as limiting the scope of the invention.

EXAMPLES

Variable Speed Generator

In a generator, torque is always in a constant direction, i.e., resisting the rotation of the prime mover. The prime mover is any device, e.g., a gasoline or diesel engine, a turbine, a water wheel, or similar source of rotational mechanical energy, which drives the generator. At low speed the prime mover typically has low power, and the ability of the generator to deliver electrical power is therefore low. Prime movers ordinarily produce greater power at higher speeds, and thus the generator should be designed to produce greater power at higher speeds.

Ideally the generator output should match the prime mover output at all speeds. Improvements in power semiconductors permit power electronic converters to receive large amounts of power at a range of frequencies and efficiently and cost effectively deliver output power, either at DC or as a synthesized waveform at another frequency. Consequently, designers can optimized their designs to accommodate prime movers operating at higher or variable speeds, instead of being limited to sources rotating at a fixed speed tied to a required output frequency, or having to include a speed matching device such as a gearbox.

It is also desired that at all speeds the output voltage be constant. These features permit a much simpler and less expensive power electronic control strategy. Therefore, for situations of variable speed and variable power, the most desirable situation is that only the output current should change, or change minimally.

If the rotatable stator is mounted on variable points, the rotating stator is allowed to move a limited amount as function of applied torque. When the rotatable stator is at rest in a zero misalignment position, this yields the maximum generated EMF.

The preferred prime mover speed profile is to operate the prime mover at high speed for high power, and low speed for low power.

At low speed, power is low and current is low. Torque is a function of generated output power divided by speed, hence torque is also low. Therefore, prime mover speed is typically increased to produce both greater power and current and torque. The increasing torque causes the rotating stator to move somewhat, the extent being determined by spring force. By itself, the rotating stator causes the generated EMF to decrease, but simultaneously the increased speed increases the generated EMF. These at least partially offsetting increases and decreases are carefully designed by the machine designer to produce the desired substantially constant output voltage. Careful consideration of: the spring force, the generated EMF at minimal misalignment, the non-linear reduction of EMF with rotation degree, the linear increase in generated EMF due to speed, and the overall electrical circuit and resulting phasor diagram permits one of ordinary skill in the art to design a machine to produce the desired constant voltage output.

Figure 23:
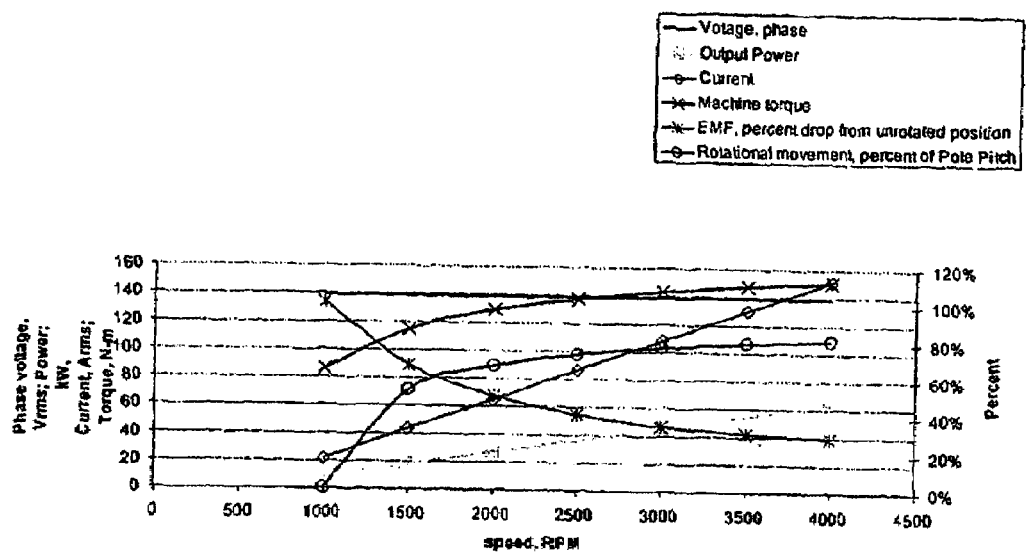
FIG. 23 shows a plot of the parameters of a generator during operation according to the invention.

It is also possible to allow the torque produced on the stator to supply the force to move the stator. FIG. 23 shows a plot of the parameters of the generator during operation according to this embodiment of the invention. As the generator output power increases, so does the current. The rotor torque increases along with the increase in power output and current. The increasing rotor torque acting on the stators eventually overcomes the tension supplied by the springs attached to the rotatable stator, which causes the rotatable stator to rotate. The rotation of the rotatable stator causes the generated EMF to drop, limiting the voltage. Therefore, in this embodiment of the invention, the rotor produces an amount of torque directly as a function of the current flowing in the coils in both stators. In this manner the invention provides a self-regulating machine that provides near constant voltage.

Although the present invention has been described above with rather full detail it will be understood that such detail need not be strictly adhered to, but that additional changes and modifications may suggest themselves to one skilled in the art. For example, the stators may be offset by any number of different angles to provide different results. It is accordingly intended that such modifications be encompassed by the scope of the invention, as defined by the subjoined claims.

What is claimed is:

1. A method for operating an axial air-gap machine system, comprising:
   (a) providing an axial air-gap electric machine comprising a first stator having a plurality of teeth and a first set of windings positioned thereon; a second stator having a plurality of teeth and a second set of windings positioned thereon; and a rotor disposed for rotation about an axis, the rotor being disposed axially between the stators, and wherein the stators comprise toroidal cores having laminated layers composed of a material selected from the group consisting of amorphous and nanocrystalline metals and optimized Fe-based alloy;

(b) providing a power electronics means for interfacing and controlling the machine;

(c) operably connecting the power electronics means to the machine;

(d) selectively aligning the second stator with respect to the first stator such that the teeth of the second stator are offset by an offset amount from the teeth of the first stator;

(e) wherein the machine further comprises misalignment means for adjusting the offset amount, and the method further comprises selecting the offset amount to reduce the torque ripple of the machine and adjusting the offset amount using the misalignment means to maintain a substantially constant voltage characteristic and adaptively controlling the adjustment of the offset amount using a signal transmitted from the power electronics means to the misalignment means.

2. The method of claim 1, wherein the machine is polyphase.

3. The method of claim 1, wherein the misalignment means comprises at least one of: a two position solenoid; a voice coil motor; a piezoelectric actuator; a stepper or other motor with a gear or lead screw; a vacuum cylinder; an air pressure cylinder; a hydraulic cylinder; and a linear motor.

4. The method of claim 3, wherein the misalignment means comprises a stepper motor and lead screw.

5. The method of claim 1, wherein the laminated layers are composed of amorphous metal.

6. The method of claim 1, wherein the laminated layers are composed of nanocrystalline metal.

7. The method of claim 1, wherein the laminated layers are composed of optimized Fe-based alloy.

8. The method of claim 1, wherein the rotor comprises a plurality of rotor magnets composed of a rare earth-transition metal alloy.

9. The method of claim 8, wherein the rotor magnets are SmCo or FeNdB magnets.

10. The method of claim 1, wherein the axial air-gap machine has a slot per phase per pole ratio that ranges from about 0.25 to 4.0.

11. The method of claim 10, wherein the slot per phase per pole ratio ranges from about 0.25 to 1.

12. The method of claim 10, wherein the slot per phase per pole ratio is 0.50.

13. The method of claim 1, wherein the axial air-gap machine has at least 16 poles.

14. The method of claim 1, wherein the axial air-gap machine has at least 32 poles.

15. The method of claim 1, wherein the axial air-gap machine is run with a commutating frequency ranging from about 500 Hz to 3 kHz.

16. The axial air-gap machine of claim 15, wherein the commutating frequency ranges from about 600 to 1000 Hz.

* * * * *